US012495071B2

(12) United States Patent
Sarakas

(10) Patent No.: US 12,495,071 B2
(45) Date of Patent: Dec. 9, 2025

(54) EMERGENT WEB SPACES AND SYSTEM

(71) Applicant: Callplex, Inc., St. Peters, MO (US)

(72) Inventor: Stephen T. Sarakas, St. Peters, MO (US)

(73) Assignee: Callplex, Inc., St. Peters, MO (US)

( * ) Notice: Subject to any disclaimer, the term of this patent is extended or adjusted under 35 U.S.C. 154(b) by 58 days.

(21) Appl. No.: 18/642,577

(22) Filed: Apr. 22, 2024

(65) Prior Publication Data

US 2025/0106248 A1  Mar. 27, 2025

Related U.S. Application Data

(60) Provisional application No. 63/540,693, filed on Sep. 27, 2023.

(51) Int. Cl.
*H04L 29/06* (2006.01)
*G06F 7/58* (2006.01)
*H04L 9/40* (2022.01)

(52) U.S. Cl.
CPC .......... *H04L 63/1483* (2013.01); *G06F 7/582* (2013.01); *G06F 7/588* (2013.01)

(58) Field of Classification Search
CPC ....... H04L 63/1483; G06F 7/582; G06F 7/588
See application file for complete search history.

(56) References Cited

U.S. PATENT DOCUMENTS

| | | | |
|---|---|---|---|
| 8,220,037 B2 | 7/2012 | Snyder et al. | |
| 8,595,277 B2 | 11/2013 | Goettfert et al. | |
| 9,449,197 B2 | 9/2016 | Green et al. | |
| 9,502,356 B1 | 11/2016 | Parvarandeh | |
| 9,910,929 B2 | 3/2018 | Shinde | |
| 11,055,065 B2 | 7/2021 | Wang | |
| 2006/0230344 A1 | 10/2006 | Jennings et al. | |
| 2009/0204657 A1 | 8/2009 | Goettfert et al. | |
| 2014/0115136 A1* | 4/2014 | Shinde | G06F 16/972 709/223 |
| 2014/0344321 A1 | 11/2014 | Hamilton et al. | |
| 2014/0365861 A1 | 12/2014 | Lasmarias et al. | |

(Continued)

OTHER PUBLICATIONS

Herring, C. et al., "Random Number Generators are Chaotic" ACM Sigplan Notices, vol. 24 Issue 1101, pp. 76-79, Nov. 1989, https://doi.org/10.1145/71605.71608.

(Continued)

*Primary Examiner* — Wasika Nipa
(74) *Attorney, Agent, or Firm* — Stinson LLP

(57) ABSTRACT

A system implements an emergent web space to bind a host computer to one or more client computers. A host computer generates data aspects of characteristically random data to create emergent web spaces in which website resources can be rendered by one or more client computers intersecting the same emergent web spaces. A binding is established between the host computer and one or more client computers when a block of true random data generated by the host computer is provided to the one or more client computers. A unique block of true random data together with the remote storage of data aspects constitutes a zone. A software application executing on the one or more client computers is configured to retrieve data aspects from within the same zone, and further configured to resolve and then render website resources.

18 Claims, 27 Drawing Sheets

(56) References Cited

U.S. PATENT DOCUMENTS

| | | | | |
|---|---|---|---|---|
| 2014/0372767 A1* | 12/2014 | Green | ............... | G06F 21/72 713/189 |
| 2021/0255834 A1* | 8/2021 | Valentino | ............ | G09B 7/00 |
| 2023/0004661 A1* | 1/2023 | Choi | ............... | G06F 21/602 |

OTHER PUBLICATIONS

Jacak, M., et al., "Quantum generators of random numbers" Sci Rep 11, 16108, 2021, 21 pages, https://doi.org/10.1038/s41598-021-95388-7.

Kuang, R., et al., "Pseudo Quantum Random Number Generator with Quantum Permutation Pad," 2021 IEEE International Conference on Quantum Computing and Engineering (QCE), Broomfield, CO, USA, 2021, pp. 359-364, doi: 10.1109/QCE52317.2021.00053.

Stepney, S., et al., "Engineering emergence," 11th IEEE International Conference on Engineering of Complex Computer Systems (ICECCS'06), Stanford, CA, USA, 2006, pp. 9 pages., doi: 10.1109/ICECCS.2006.1690358.

Fromm, J., On Engineering and Emergence, arXiv: Adaptation and Self-Organizing Systems, 2006, 11 pages.

Johnson IV, John J., "A General Theory of Emergence in Engineered Systems," Doctor of Philosophy (PhD), Dissertation, Engineering Management & Systems Engineering, Old Dominion University, 2016, 2010 pages, DOI: 10.25777/z4dt-1389 https://digitalcommons.odu.edu/emse_etds/8.

Jeftovic, M.E., Managing Mission-Critical Domains and DNS, 2018, 50 pages Birmingham, UK: Packt Publishing.

Uche, Adaeze, What Are IPFS Phishing Attacks and How Do You Avoid Them? May 7, 2023, 9 pages, Retrieved from MUO Make Use Of: https://www.makeuseof.com/what-are-ipfs-phishing-attacks-and-how-to-avoid-them/.

Cybersecurity & Infrastructure Security Agency, CISA and Partners Release Joint Cybersecurity Advisory on Preventing Web Application Access Control Abuse, Jul. 27, 2023, 3 pages, Retrieved from CISA: https://www.cisa.gov/news-events/alerts/2023/07/27/cisa-and-partners-release-joint-cybersecurity-advisory-preventing-web-application-access-control.

Cybersecurity & Infrastructure Security Agency, DoS and DDOS Attacks against Multiple Sectors, Jun. 30, 2023, 3 pages, Retrieved from CISA: https://www.cisa.gov/news-events/alerts/2023/06/30/dos-and-ddos-attacks-against-multiple-sectors.

Gritzman, et al., Cloud Account Takeover Campaign Leveraging EvilProxy Targets Top-Level Executives at over 100 Global Organizations, Aug. 9, 2023, 7 pages, Retrieved from Proofpoint blog: https://www.proofpoint.com/us/blog/email-and-cloud-threats/cloud-account-takeover-campaign-leveraging-evilproxy-targets-top-level.

ID Quantique, Quantum versus Classical Random Number Generators, Geneva, Switzerland: ID Quantiquem, 2023, 17 pages, Retrieved from ID Quantique: https://marketing.idquantique.com/acton/attachment/11868/f-64900ef6-6e7e-4b4c-a9f9-c912a2cfde59/1/-/-/-/-/Classical RNG Vs QRNG_White Paper.pdf.

India Times, Malicious links now top cyber attack threat globally: Report Retrieved from Economic Times Telecom: https://telecom.economictimes.indiatimes.com/news/internet/malicious-links-now-top-cyber-attack-threat-globally-report/102765655, Aug. 16, 2023, 4 pages.

Jai Vijayan, More Than Half of Browser Extensions Pose Security Risks, Retrieved from Dark Reading: https://www.darkreading.com/cloud/study-more-than-half-of-browser-extensions-pose-security-risks, Aug. 22, 2023, 3 pages.

Lucas Silva, et al., Malvertising Used as Entry Vector for BlackCat, Actors Also Leverage SpyBoy Terminator, Retrieved from Trend Micro: https://www.trendmicro.com/en_us/research/23/f/malvertising-used-as-entry-vector-for-blackcat-actors-also-lever.html, Jun. 30, 2023, 12 pages.

Palo Alto Networks, What is DNS Tunneling? Retrieved from paloaltonetworks.com/cyberpedia: https://www.paloaltonetworks.com/cyberpedia/what-is-dns-tunneling, 2023, 6 pages.

Sead Fadilpašić, More and more criminals are using legitimate websites to obfuscate malicious payloads, Retrieved from techradar: https://www.techradar.com/news/more-and-more-criminals-are-using-legitimate-websites-to-obfuscate-malicious-payloads, May 29, 2023, 3 pages.

Sandeep Babu, What Is a Website Defacement Attack and How Can You Protect Your Website? Retrieved from MUO Make Use Of: https://www.makeuseof.com/what-is-website-defacement-attack-how-to-protect-your-website, Sep. 1, 2023, 14 pages.

Jaeson Schulz, et al., What's in a name? Strange Behaviors at Top-level domains creates uncertainty in DNS, Retrieved from Talos Intelligence: https://blog.talosintelligence.com/whats-in-a-name/, Aug. 29, 2023, 7 pages.

Information Commissioner's Office, Joint Statement on Data Scraping and the Protection of Privacy, Retrieved from ICO: https://ico.org.uk/media/about-the-ico/documents/4026232/joint-statement-data-scraping-202308.pdf, Aug. 24, 2023, 6 pages.

Paul Pearce, et al., Global Measurement of DNS Manipulation, Retrieved from USENIX: https://www.usenix.org/system/files/conference/usenixsecurity17/sec17-pearce.pdf, Aug. 16-18, 2017, 19 pages.

Donghui Yang, et al., A Deep Dive into DNS Query Failures, Retrieved from USENIX: https://www.usenix.org/system/files/atc20-yang.pdf, Jul. 15-17, 2020, 9 pages.

Radware, Escalating Trends in DNS Flood Attacks, Retrieved from radware: https://www.radware, com/security/threat-advisories-and-attack-reports/escalating-trends-in-dns-flood-attacks/, Jun. 7, 2023, 14 pages.

Wu, Hongjun, A New Stream Cipher HC-256, Fast Software Encryption, Institute for Infocomm Research, FSE 2004, LNCS 3017: Apr. 15, 2004, 23 pages, Singapore.

* cited by examiner

```
200
┌─────────────────────────────────────────────┐
│  <!DOCTYPE html>                            │
│  <html lang="en-us">                        │
│  <head>                                     │
│      <meta charset="utf-8">                 │
│      <title>Surfing Hot Spots</title> ─201  │
│  </head>                                    │
└─────────────────────────────────────────────┘

202
┌─────────────────────────────────────────────┐
│                                             │
│  Set character_array to [AaBbCc...456789]─203│
│                                             │
│                              ─204           │
│  GENERATE ALIAS FROM TITLE                  │
│      Set NAME to TITLE                      │
│      Make NAME all lowercase, remove whitespaces ─205 │
│      Seed prng with hash value of NAME      │
│      Set size to length of character_array  │
│      Set ALIAS to empty string              │
│                                             │
│      While (ALIAS length < 32) ─206         │
│          Set number to next prng output     │
│          Set index to (number % size)       │
│          Get character at character_array[index] │
│          Append character to ALIAS          │
│                                             │
└─────────────────────────────────────────────┘
```

Figure 2

```
#[derive(Debug)]
struct Xoshiro256 ( u64, u64, u64, u64 );

impl Xoshiro256 { ——300 fn new(seed: &Vec<u8>) -> Xoshiro256 { ——301 let mut nums: [u64; 4] =
        [
            u64::from_be_bytes((&seed[0..8])
                .try_into().expect("incorrect length")),
            u64::from_be_bytes((&seed[8..16])
                .try_into().expect("incorrect length")),
            u64::from_be_bytes((&seed[16..24])
                .try_into().expect("incorrect length")),
            u64::from_be_bytes((&seed[24..32])
                .try_into().expect("incorrect length"))
        ];
        for _x in 0..nums.len() { ——302 let mut z = nums[_x].wrapping_add(0x9e3779b97f4a7c15);
            z = (z ^ (z >> 30)).wrapping_mul(0xbf58476d1ce4e5b9);
            z = (z ^ (z >> 27)).wrapping_mul(0x94d049bb133111eb);
            nums[_x] = z ^ (z >> 31);
        }
        Xoshiro256(nums[0], nums[1], nums[2], nums[3] )
    } fn next(&mut self) -> u64 { —— 303 self.2 ^= self.0;
        self.3 ^= self.1;
        self.1 ^= self.2;
        self.0 ^= self.3;

let t = self.1 << 17;
        self.2 ^= t;

let result = self.1.wrapping_mul(5).rotate_left(7).wrapping_mul(9);
        self.3 = self.3.rotate_left(45);

result as u64
    }
}
```

Figure 3

EMERGENT WEB SPACES AND SYSTEM

CROSS-REFERENCE TO RELATED APPLICATIONS

This application claims the benefit of U.S. Provisional Patent Application Ser. No. 63/540,693, filed on Sep. 27, 2023, the entire contents of which are hereby incorporated by reference.

FIELD

The present disclosure generally relates to systems and methods for provisioning websites and for protecting website visitors.

BACKGROUND

Presently, the Internet connects approximately two billion websites. Websites are associated with registered domain names. Hundreds of millions of domain names have been registered, with tens of thousands more becoming registered every day. Some registrations are new, while others are renewals of existing registrations. Domain name extensions are further chosen from a list of at least sixteen hundred extensions. Some domain name extensions are reserved for different countries.

Many find it impossible to obtain a desired domain name, quickly discovering that their choice has already been registered by someone else. Others, having successfully registered a desirable domain name, wish only to resell it at a high price, further contributing to the scarcity of domain names from which to choose. While a significant percentage of websites are inactive, domain names associated with these remain unavailable. A registered trademark has little impact on the use of a domain name.

Separate registration is required for every iteration or extension of a domain name, multiplying the fees incurred. Renewal fees must be paid annually, although fees can be paid at once for multiple years. If fees are not timely paid, the associated registration expires and the domain name becomes available once again. The management of many different domain names quickly becomes burdensome. For this reason, only popular domain extensions are commonly chosen for registration. However, any remaining extensions not registered, even one of an obscure country, may be registered by anyone and then used to confound visitors when search engine tactics are employed. The list of extensions is being added to regularly, further compounding the problem.

The intent and purpose of domain names is to provide easily recognizable and memorable names that correspond to numerically addressed Internet resources. The scarcity of desirable domain names often compels registrants to apply clever twists to a desired domain name, inadvertently adding to confusion between websites with similar domain names. Adversaries readily take advantage of the confusion in a scheme referred to as typosquatting, in which visitors are unwittingly misdirected to the adversary's website from which they may be exposed to attacks. Website visitors are the victims.

Website visitors have become accustomed to simply clicking on a hyperlink, to automatically direct their browser to a website. Few may actually enter the path to a website, character by character. As a result, registrants have become increasingly reliant upon the distribution of a hyperlink. Many websites include such hyperlinks on every page. This may seem to diminish the importance of a desirable domain name, but it raises other serious problems. A hyperlink can be spelled differently than the actual domain name to which it directs a visitor, a common means of deception. Services replace hyperlinks with abbreviated versions for convenience, further complicating this threat. Malicious links are associated with schemes referred to as phishing and are often the first tactic in a larger attack. Many variants of these attacks have been documented. Again, website visitors are the victims.

The numerical Internet Protocol (i.e., IP) address associated with a particular domain name may change periodically. To ensure timely and correct routing of traffic, the Internet relies on the Domain Name System (i.e., DNS) to maintain at any given time accurate records associating a domain name with its correct numerical IP address. Even the simplest website consisting of a single static page requires DNS servers to be updated with the addresses needed to route traffic to the website. Unfortunately, DNS is built upon a dated scheme and was never designed with security in mind. An added layer of security may be implemented on top of DNS, but this imposes additional burden on those wishing to securely and efficiently provision websites. DNS tunneling attacks are a unique threat. Traffic appearing to be legitimate can bypass traditional measures designed to detect and block unauthorized traffic.

A particularly insidious attack is subdomain takeover. This occurs when an attacker gains control over a subdomain of a target domain. If a DNS record points to a resource not actually served by a host, an attacker can take over that subdomain by providing their own virtual host and commence serving their own content. Attackers can use the foothold to launch attacks and even gain control of an entire domain. Broken hyperlinks that do not point to a resource are another form of this vulnerability.

Most often, a website requires hosting services. Hosting services employ virtual machines to efficiently distribute hardware resources on behalf of multiple customers. Logical resources are made to share hardware instances for processing, storage and networking. This is referred to as multi-tenancy and it is common in cloud environments. A runaway process or an overload situation created by one tenant can have a negative effect on another tenant. The possibility an adversary can escape the virtual machine to access another tenant increases when multiple negative events are made to occur.

Website administrators may share responsibilities with a hosting service provider, but remain ultimately responsible for website security. Internet facing websites are navigable to anyone at any time. Protecting resources from adversaries necessitates controlling access from every direction. Misconfigurations challenge website administrators because they may not be immediately apparent. Once compromised, a website itself is considered adversarial and a threat to visitors.

Websites are vulnerable to a seemingly unlimited variety of attacks. Many are difficult to detect and difficult to mitigate. The Open Worldwide Application Security Project (i.e., OWASP) is an organization providing free and openly available resources for helping to secure websites and applications. Although far longer lists of vulnerabilities have been compiled, OWASP lists ten security risks pertaining to websites. These risks represent entire categories of vulnerabilities.

Broken Access Control
Cryptographic Failures
Injection
Insecure Design
Security Misconfiguration
Vulnerable and Outdated Components
Identification and Authentication Failures
Software and Data Integrity Failures
Security Logging and Monitoring Failures
Server-Side Request Forgery A website may be rendered inaccessible to visitors altogether by attacks which manipulate traffic to it. Denial-of-Service (i.e., DoS) attacks are intended to overwhelm a host with traffic rendering it unable to respond to legitimate requests, even to crash. This is frequently achieved by coordinating a simultaneous attack from multiple sources in a Distributed Denial-of-Service (i.e., DDoS) attack.

Secure routing to website resources requires the application of public-key encryption. The validity of a public key is bound to a digital certificate which in turn, is bound to a domain name. Expired, corrupt or otherwise invalid certificates can jeopardize the security of a website and prevent visitors from reaching it. Although modern browsers are especially configured to prevent navigation to insecure websites, they are nonetheless the largest single attack surface in an organization.

It is possible to provision a resource reached with the numerical IP address alone and without registering a domain name. A requirement to do so is largely driven by the proliferation of Internet-connected devices. Because an IP address assigned to a certain resource can change, preventing disruption requires much greater control of the IP address. Moreover, websites are not devices and there remains a need to associate meaningful names with numerical IP addresses.

The need often arises to provision a private, temporary website but without the burden of domain name registration or the management of user credentials and enforcement of access controls. An organization may wish to disseminate sensitive information to clients and personnel. Usually a new page is added to an existing website for this purpose. Examples include confidential meeting minutes and drawings related to a proposed engineering project.

Individual files comprising website resources can also be rendered by a browser without provisioning a website. Files may be stored locally or in remote locations such as a personal cloud storage drive. If the files are made accessible to others, a browser may be directed to the files by anyone with knowledge of the file paths. Resources accessed in this way are referred to as location-based. Distributed location-based resources may be hosted by peer-to-peer (i.e., P2P) file sharing networks. Torrents refer to objects that capsulize information about resources available from participating peers.

When distributed resources are accessed by location alone, several disadvantages become realized. These include the inherent presumption that a desired resource will be found at the given location together with an undesirable concentration of control by those managing the location. These concerns have driven the development of file sharing networks which are both distributed and decentralized. The name and path to a resource is replaced with a list of hosts from which the resource may be requested. Both the identity of a resource and its integrity are related to names indexed on a distributed list. The integrity of a file may then be confirmed by comparing the hash of file contents. Resources accessed in this way are referred to as content-addressed. A magnet link is a type of link that points to a torrent which includes the distributed hash table.

The InterPlanetary File System (i.e., IPFS) is a distributed and decentralized file-sharing network that uses content-addressing. IPFS has been used to host websites. An IPFS protocol replaces the Hypertext Transfer Protocol (i.e., HTTP) and Hypertext Transfer Protocol Secure (i.e., HTTPS) protocols which conventional browsers use to connect with web servers. However, DNS gateways can provide HTTP and HTTPS compatibility for browsers. Unfortunately, the availability of resources remains dependent on cooperative hosts and there is no provision for confidentiality.

Decentralized file sharing networks such as the IPFS are increasingly used by adversaries to deceive unsuspecting individuals into exposing sensitive information or to install malware. By leveraging the IPFS network to host their phishing kit infrastructure, their activities are easily hidden. Malicious data uploaded onto one of the connected networks can be distributed to other nodes, yet it can only be deleted by their owners. In this way, IPFS phishing content is distributed, persistent and more difficult to detect.

This background is provided only as a brief description of a selection of the many problems imposed on organizations and individuals wishing to provision a website. Threats to website visitors which result from provisioning websites with conventional technologies have been discussed briefly.

SUMMARY

The present disclosure employs emergent web spaces to provide an improved framework for provisioning websites.

In one embodiment, a computer-implemented method for binding a host computer to one or more client computers with emergent web spaces, involves a union of a remote data storage device and a block of true random data common to both a host and a client, and concurrently accessible to a software application executing on one or more client computers. The software application executing on a host computer, invokes a local source of true random data. The software application executing on the host computer collects true random data as a block of true random data. The software application executing on the host computer, separates website resources into data objects, and for each data object: designates, by the software application executing on the host computer, a unique name, creates, by the software application executing on the host computer, a dynamic model for generating a data aspect by deriving a unique subset of the block of true random data in accordance with the unique name and the size of said data object, dividing said data object into a first set of at least one data element, and generating a second set of data elements from said unique subset of true random data and the said first set of at least one data element. The software application executing on the host computer, transfers said generated second set of data elements to the remote data storage device as a single data aspect. A copy of said block of true random data is provided to said software application executing on the one or more client computers. Said designated unique names are provided to said application executing on the one or more client computers.

In another aspect, a computer-implemented method of generating a data object comprises determining, by a software application executing on a client computer, a name of a data aspect from a unique name of a data object. The software application executing on the client computer, to retrieve said data aspect from a remote data storage device.

The software application executing on the client computer, creates a dynamic model for generating a data object by: deriving a unique subset of the block of true random data in accordance with the unique name and the size of the retrieved data aspect, dividing said data aspect into a first set of at least one data element, and generating a second set of data elements from the said first set of data elements and the said unique subset of true random data. The software application executing on the client computer, assembles said generated second set of data elements as a single data object.

In another aspect, a system for implementing an emergent web space comprises an entropy device serving as a local source of true random data and implementing at least one of a classical random number generator and a quantum random number generator, and at least one remote data storage device. A host computing device has one or more processors configured to connect to and obtain true random data from said entropy device, store blocks of true random data in nonvolatile memory, separate a website into data objects corresponding to web resources, designate a unique name for a data object, replace references to other data objects with unique names, perform data compression of a data object, create a dynamic model for generating a data aspect, perform a cryptographic hash of data, generate a unique subset of true random data, divide a data object into data elements, perform addition modulo-2 logical operations, collect data elements as a single data aspect, generate a unique name for a data aspect, transfer generated data aspects to the at least one remote data storage device, provide a block of true random data to a client computing device and provide designated unique names to a client computing device. A client computing device has one or more processors configured to derive a unique name of a data object from a document title, generate a unique name of a data aspect, retrieve a data aspect from the at least one remote data storage device, create a dynamic model for generating a data object, perform a cryptographic hash of data, retrieve blocks of true random data from nonvolatile memory, generate a unique subset of a block of true random data, divide a data aspect into data elements, perform addition modulo-2 logical operations, collect data elements as a single data object, perform data decompression of a data object, derive other unique names from a data object, render web resources as a webpage, render individual data objects as chunks of a media resource and display a document title as the identity of a website.

Other objects and features will be in part apparent and in part pointed out hereinafter.

BRIEF DESCRIPTION OF THE DRAWINGS

FIG. 2 is an illustration of pseudocode for an exemplary naming scheme to generate the alphanumeric alias of an independent web resource as a data object, according to an embodiment.

FIG. 3 is an illustration of source code for an exemplary implementation of a type of pseudo-random number generator, according to an embodiment.

Corresponding reference characters indicate corresponding parts throughout the drawings.

DETAILED DESCRIPTION

Figure 1:
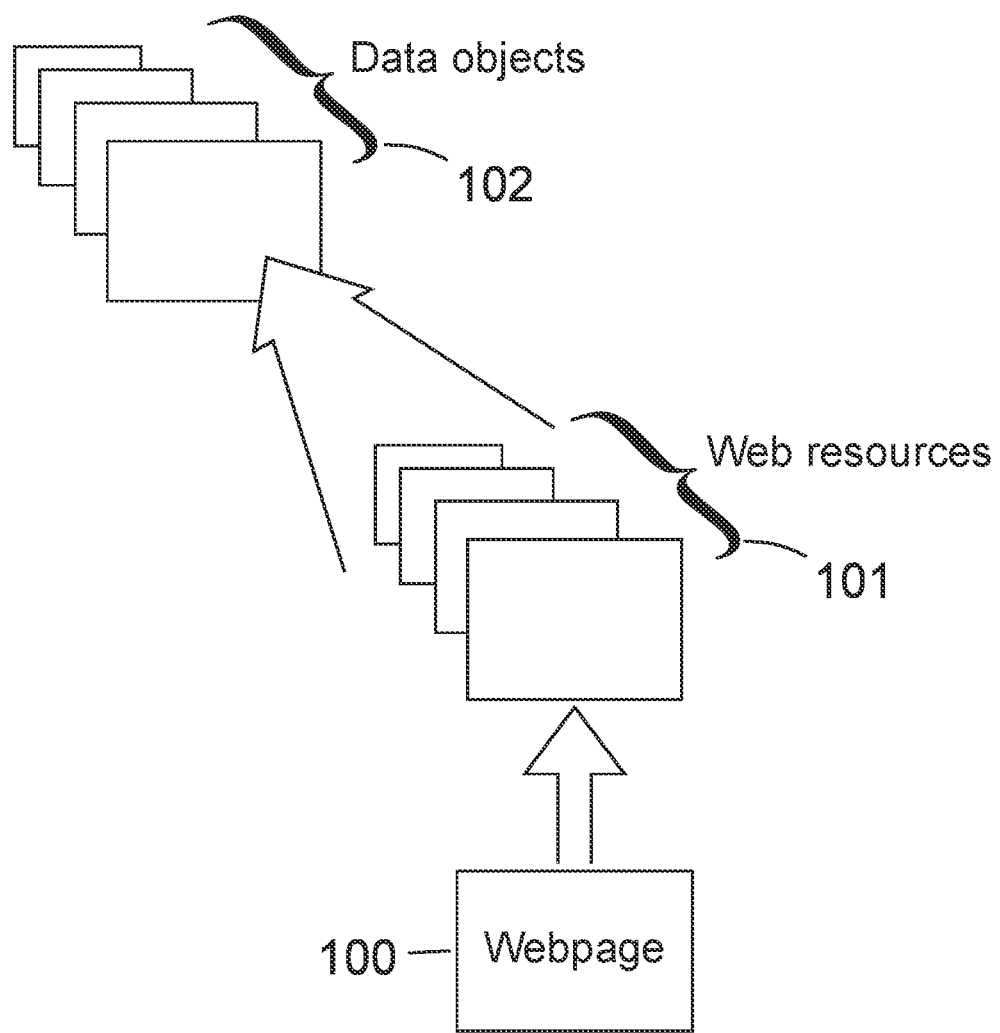
FIG. 1 is a schematic illustration of a webpage decomposed into web resources, and illustrates the relationship between web resources and data objects, according to an embodiment.

Embodiments of the present invention overcome numerous disadvantages imposed on organizations and individuals wishing to provision a website, and to website visitors, by creating emergent web spaces. A host computer generates data aspects of characteristically random data to create emergent web spaces in which website resources can be rendered by one or more client computers intersecting the same emergent web spaces. A binding is established between the host computer and one or more client computers when a block of true random data generated by the host computer is provided to the one or more client computers. A unique block of true random data together with the remote storage of data aspects constitutes a zone.

Data objects correspond to website resources such as markup, styling, scripts, media and other assets. A software application executing on the host computer generates data aspects from the data objects in accordance with a dynamic model, an ensemble of functions of random processes that are unique to each data object and zone. Data objects substantially identical to original website resources are later generated by a software application executing on the one or more client computers, being resolved from the data aspects by functions of random processes related to those of the host computer which created them, unique to each data aspect and zone. Resolved website resources are rendered ordinarily by the browser-like software application executing on the one or more client computers.

Data aspects are transferred to one or more remote data storage devices by a software application executing on the host computer, and may be deleted by the same. A software application executing on the one or more client computers is configured to retrieve data aspects from within the same zone, resolve and then render website resources. Conventional technologies employ web servers configured to respond directly to requests for website resources issued by browsers. Access controls alone separate administrator and user roles. Embodiments of the present invention overcome numerous disadvantages of conventional technologies by moving the resolution of website resources to emergent web spaces defined by zones. Together with the strong separation of control between host and clients, website visitors are thereby protected from threats associated with compromised web servers.

The one or more remote data storage devices are configured to provide an inventory of data aspects only to the software application executing on the host computer, and to respond only to GET requests for data aspects from a software application executing on one or more client computers, when given the exact name of each. A content delivery network (i.e., CDN) generally serves this purpose. Embodiments of the present invention thereby overcome numerous disadvantages of conventional technology by employing one or more remote storage devices having attributes that include resilience, efficiency and resistance to DDoS attacks. Conventional technology typically offers high availability in failover configurations by employing multiple web servers, gateways, load balancers and monitoring services. Embodiments of the present invention greatly reduce the complexity of achieving the same objectives while eliminating the associated operating expenses.

Conventional web servers store website resources in disk file systems. The identity of each and its context are plain. Access controls alone separate administrator and user roles. In contrast, data aspects created by embodiments of the present invention do not contain information from corresponding data objects. Website resources resolved by embodiments of the present invention do not have separately identifiable paths and are resolved only within emergent web spaces intersected by both host and client. Only within the same emergent web space can even the identity of data aspects be known. The introduction of malware by adversaries is thereby prevented by embodiments of the present invention.

Conventional browsers generally allow navigation to any website, which respond to requests from any browser. This any-to-any relationship imposes extraordinary demands on conventional browsers to prevent navigation to unsafe websites. A complex mix of tools is needed, which in turn requires a cycle of software updates following the discovery of each new threat. Embodiments of the present invention subscribe to a one-to-many relationship between a host and client. Website resources are resolved only within emergent web spaces intersected by both host and client. Increased isolation from the client computing environment by embodiments of the present invention provides website visitors strong protection not present in conventional technology.

Emergent web spaces are created from data aspects. Data aspects are blocks of characteristically random data with emergent properties that are generated by processes operative upon a block of true random data. Web resources comprising emergent web spaces do not have separately identifiable paths but may be resolved from the data aspects by processes related to those which generated them. A system is disclosed comprising a host computer, at least one client computer and one or more remote data storage devices. Remote data storage devices are remote only with respect to a host computer and the at least one client computer. Physical distances to network attached remote data storage device locations are unspecified. It is within the scope of the present invention that remote data storage is made available to both the host computer and the at least one client computer by attachment to any network, not necessarily the Internet.

FIG. 1 illustrates the decomposition of webpage 100 into web resources 101 (e.g., index.html, script.js, style.css and image.jpg). Data objects 102 correspond to web resources 101 when assigned unique names (i.e., alphanumeric aliases). Dependent web resources are those which support independent web resources and are not otherwise requested (e.g., script.js, style.css and image.jpg). Arbitrary names may be assigned to data objects which correspond to dependent web resources and replace references to them in other web resources. Data objects corresponding to independent web resources (e.g., index.html) are assigned names in accordance with an exemplary naming scheme.

FIG. 2 illustrates an independent web resource 200 given the common file name "index.html." Exemplary naming scheme 202 generates an alphanumeric alias of exemplary length (e.g., 32 bytes) to uniquely identify the corresponding data object. Function 204 operates on exemplary alphanumeric character array 203 by first initializing a pseudo-random number generator (i.e., PRNG) with the output of the cryptographic hash of document title 201. Instructions 206 construct the alphanumeric alias by iteratively selecting from the character array 203 in accordance with each output value of the PRNG. Document 200 may be identified by limited variants of the document title 201, by first normalizing the name 205. This provides the means by which a person may navigate to an emergent website by entering the plain name and with no knowledge of the alphanumeric alias assigned to the associated data object. Advantageously, a document title is not limited to alphanumeric characters. For example, it is within the scope of the present invention that an alphanumeric alias may be generated from a document title which contains Unicode (i.e., non-ASCII) emoticons.

In an exemplary embodiment, the cryptographic hash performed may be an algorithm chosen from the Secure Hash Algorithm (i.e., SHA) family and having an output length of 256 bits (i.e., SHA-256). In an exemplary embodiment, the PRNG may be an implementation of the Xoshiro family of pseudo-random number generators, chosen for its efficient performance. In particular, an instance of the Xoshiro256 algorithm 300 in FIG. 3 is initialized 301 by the full 256-bit output of an instance of SHA-256. Procedure 302 is incorporated into the initialization to avoid correlation between similar initialization values. Although procedure 302 is not strictly necessary in this application, it is considered best practice. Following initialization, calls to next ( ) 303 return 64-bit pseudo-random numbers.

Figure 4:
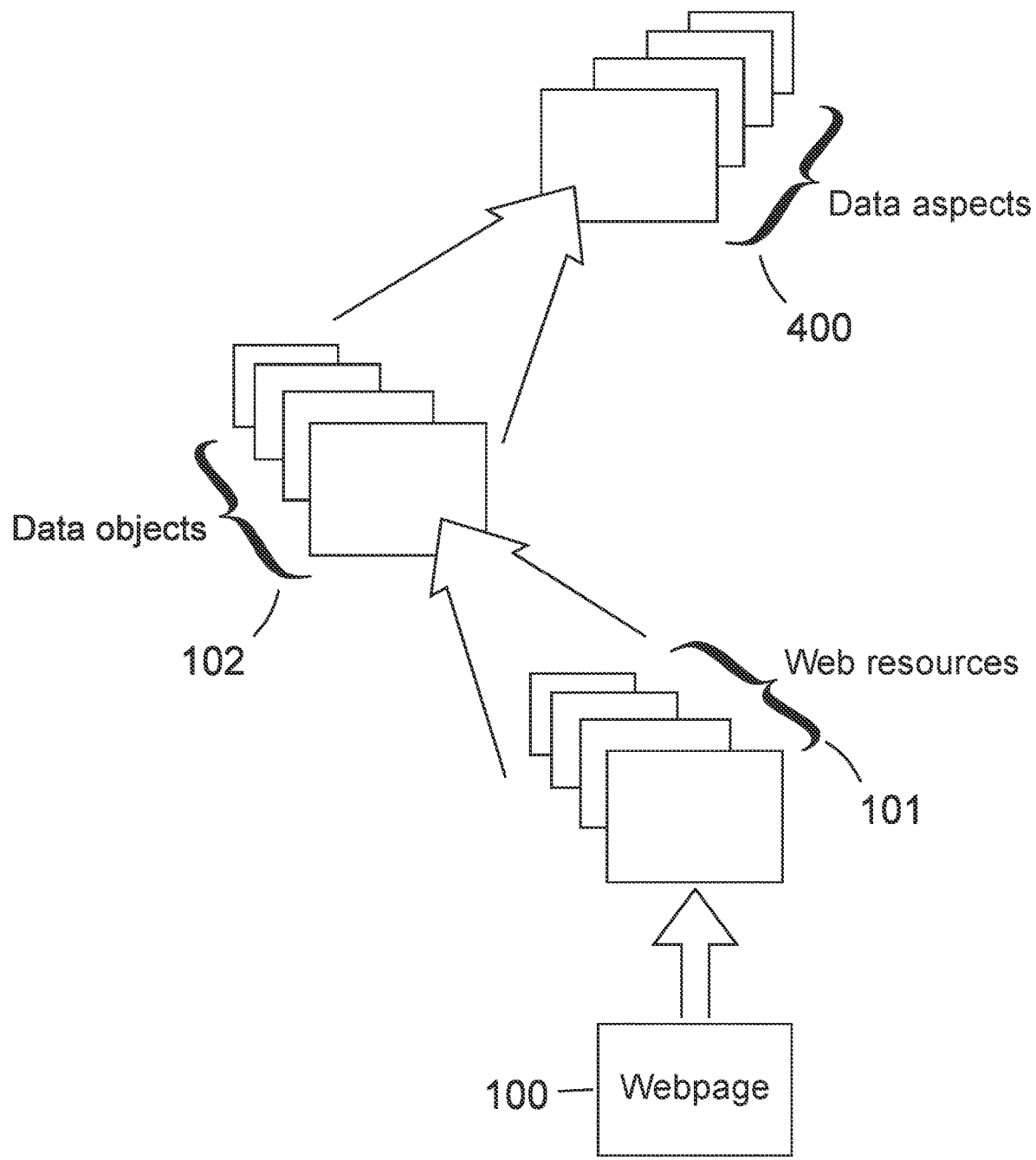
FIG. 4 is a schematic illustration of generated data aspects corresponding to data objects related to decomposition of a webpage into web resources, and the relationship between web resources and data objects, according to an embodiment.

FIG. 4 extends FIG. 1 by illustrating the generation of data aspects 400 corresponding to data objects 102. Names assigned to data objects are contingent upon the type of web resource to which each corresponds. References to web resources within other web resources are replaced with the unique names assigned to them as data objects. When a data aspect is resolved, internally referenced unique names of other data objects may then be used to resolve the corresponding web resources. Data aspects are generated in accordance with a dynamic model. Dynamic behavior of the model results from the unique characteristics of each data object. The terms "size" and "length" appearing throughout the present disclosure may be used interchangeably. Unless otherwise specified, size and length are intended to mean the same as the number of bytes in a binary object. In many cases, size or length may be relevant only in regard to objects that have undergone data compression. It is within the scope of the present invention that data objects may contain other data objects. A web resource having a size less than an exemplary predetermined minimum size is expected to be smaller still, following data compression. For example, it is desirable to incorporate a stylesheet having a size less than an exemplary predetermined minimum size directly into the requesting independent web resource.

Figure 5:
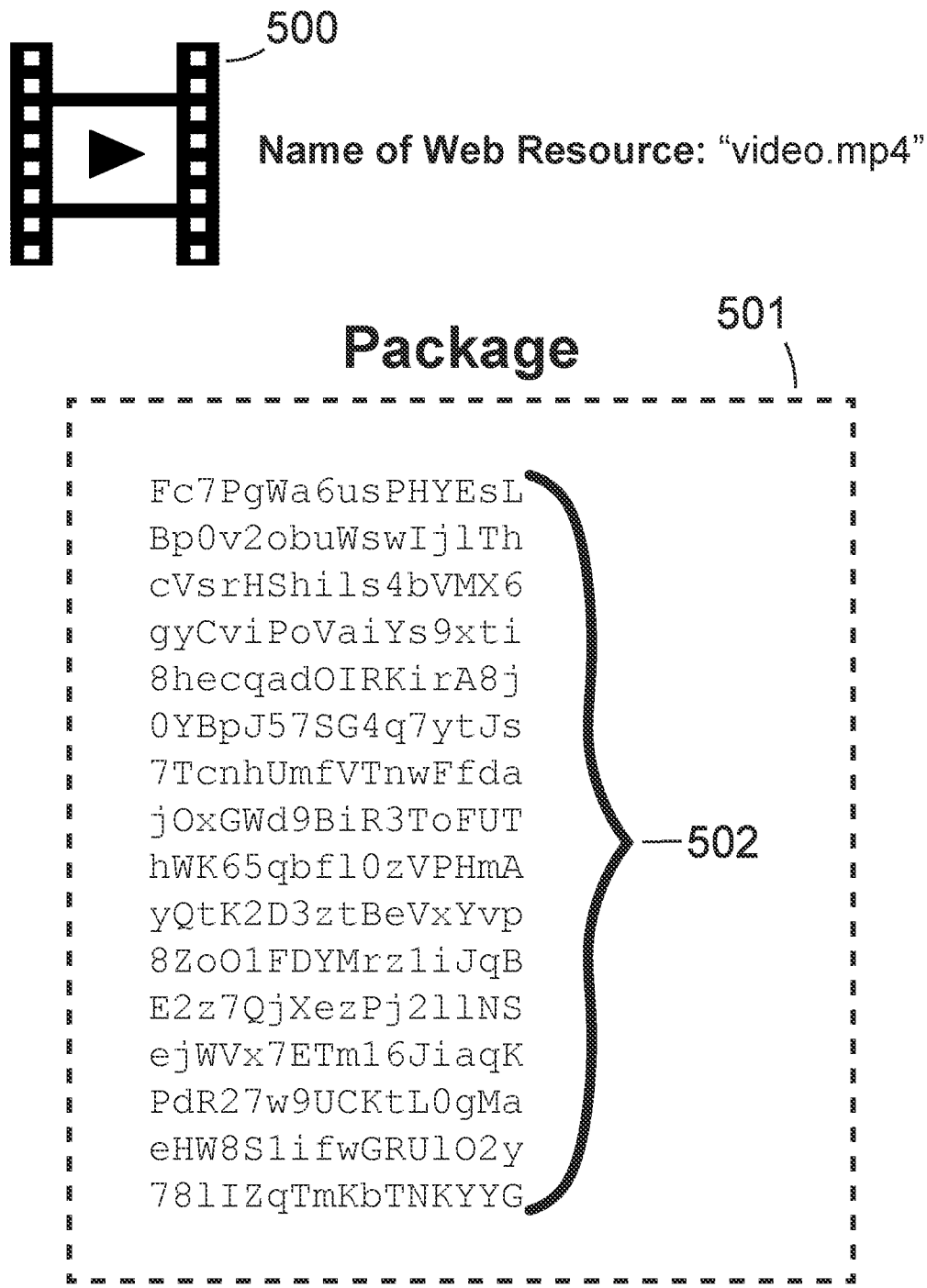
FIG. 5 is a schematic illustration of a comprehensive data object of a dependent web resource, according to an embodiment.

Compressed data objects may also be encountered having a size not less than an exemplary predetermined maximum size. For example, a web resource which cannot be timely resolved and rendered at once by the browser-like software application executing on the one or more client computers. Therefore, comprehensive data objects may be created which contain information about other data objects. By way of example, dependent web resource 500 in FIG. 5 is divided into chunks. Data objects 502 corresponding to each chunk are each assigned a unique alphanumeric alias. A comprehensive data object 501 serves to package the information and is itself assigned an alphanumeric alias.

Figure 6:
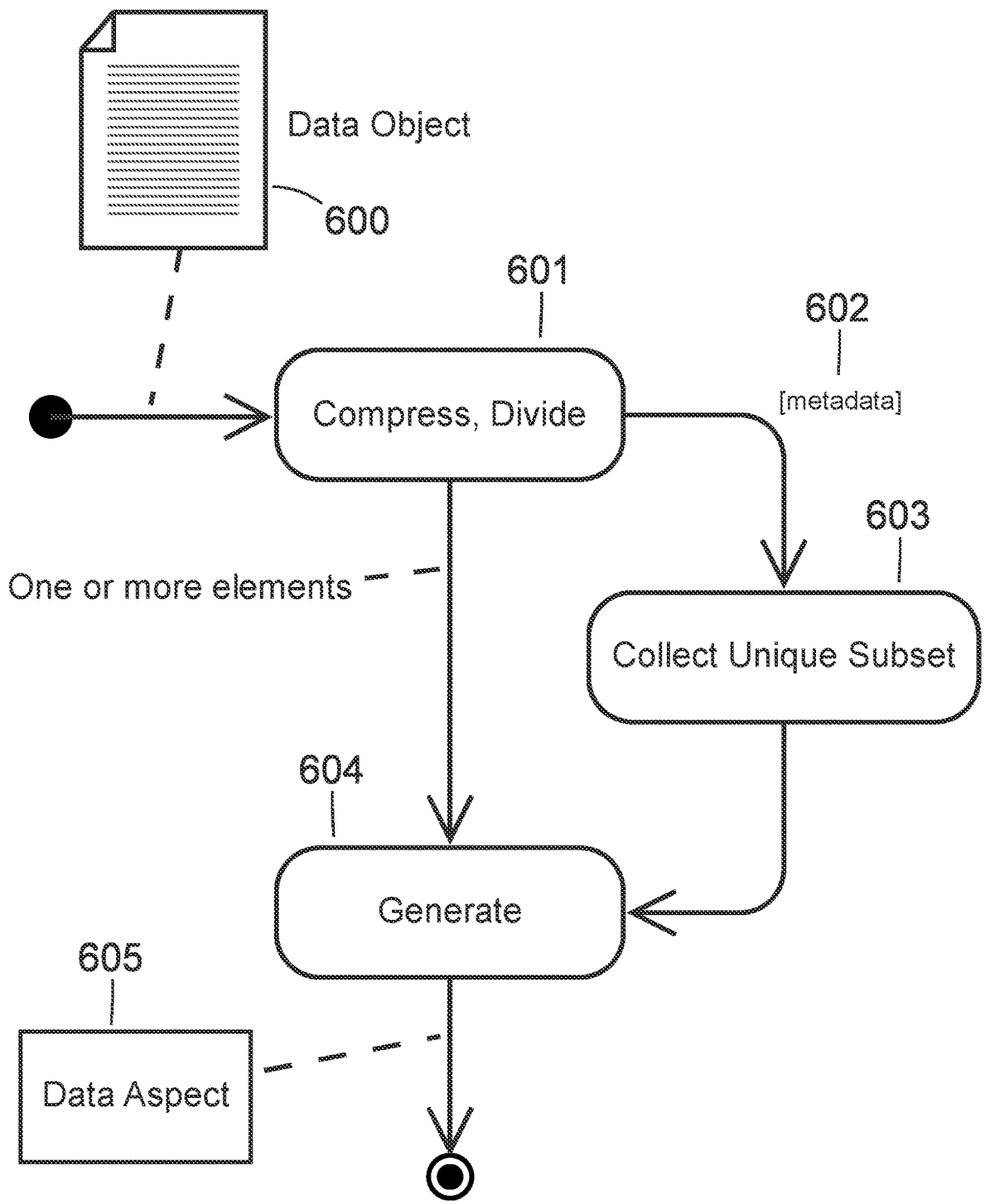
FIG. 6 is a schematic flow diagram of steps comprising exemplary generation of a data aspect, according to an embodiment.

FIG. 6 is a flow diagram of steps in the generation of data aspect 605, performed by a software application executing on the host computer. References to other web resources present in data object 600 are replaced with the unique names assigned to them prior to the compression of data object 600 in compress and divide step 601. The size of data object 600 following compression performed in the compress and divide step 601 is contained in metadata 602 and determines the behavior of the unique subset collection step 603. The behavior of generate step 604 is determined by both the output of compress and divide step 601 and the output of unique subset collection step 603. The name assigned to data aspect 605 is generated in the dynamic model and may be related to the name of data object 600.

Figure 7:
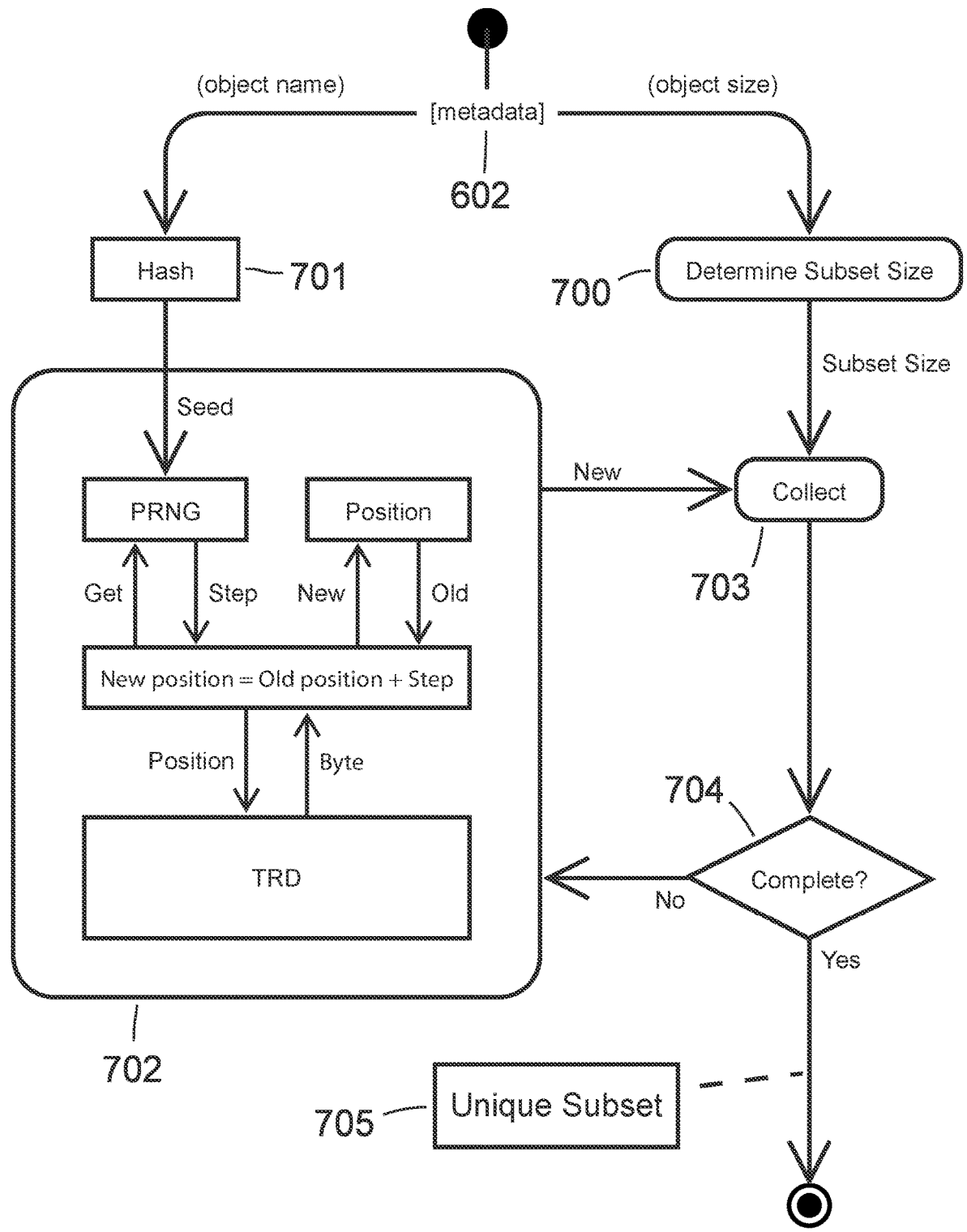
FIG. 7 is a flow diagram of steps comprising an exemplary collection method of a unique subset of true random data, according to an embodiment.

FIG. 7 is a flow diagram illustrating in greater detail the unique subset collection step 603 in FIG. 6. Metadata 602 contains both the object name and the size of the compressed data object. Step 700 determines the size of a unique subset of true random data to be collected. In an exemplary embodiment, a unique subset of true random data may be collected that is equal in length to the size of the compressed data object when the size of the compressed data object is less than an exemplary predetermined optimal length. In exemplary embodiments, a unique subset of true random data may also be collected that is smaller than the size of the compressed data object. The size of the unique subset of true random data determined in step 700 is input to collection step 703. Activity diagram 702 illustrates the components of unique subset collection. Step 701 performs a cryptographic hash of the name of the compressed data object which is then used to initialize the PRNG component within unique subset collection activity diagram 702. In an exemplary embodiment, the cryptographic hash performed may be an algorithm chosen from the Secure Hash Algorithm (SHA) family. Decision 704 determines when the size of the unique subset of true random data 705 is equal to the size predetermined in step 700.

Figure 8:
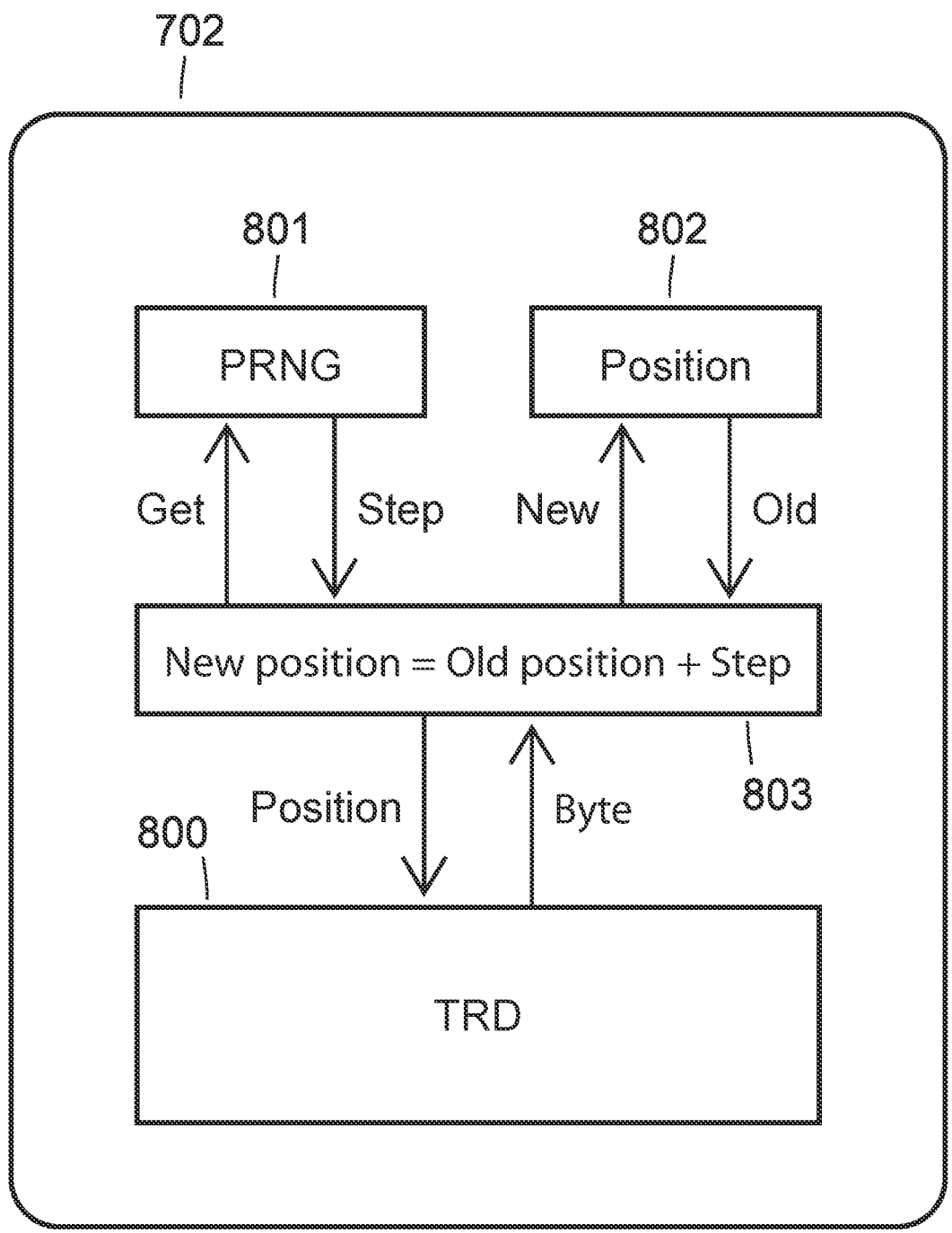
FIG. 8 is a flow diagram of an exemplary collection method of a unique subset of true random data, according to an embodiment.

FIG. 8 serves to explain activity diagram 702 in FIG. 7 and the components of unique subset collection in greater detail. A unique subset of true random data is collected by iteratively stepping through the block of true random data 800 in accordance with each new output value of PRNG 801. The cumulative value of position is stored in temporary storage 802. The block of true random data 800 is unique to each zone and common to both the host computer and the one or more client computers intersecting the same emergent web space. In an exemplary embodiment, the block of true random data may be 1 megabyte (i.e., 1 MB) in length. In an exemplary embodiment, the size of each step may be limited to a 16-bit value having 65,536 different possible values. Therefore, the end of said exemplary block of true random data will be reached after accumulating an average of 31 steps. To determine the next position, calculation component 803 performs the iterative stepping function together with a wrapping function.

Figure 9:
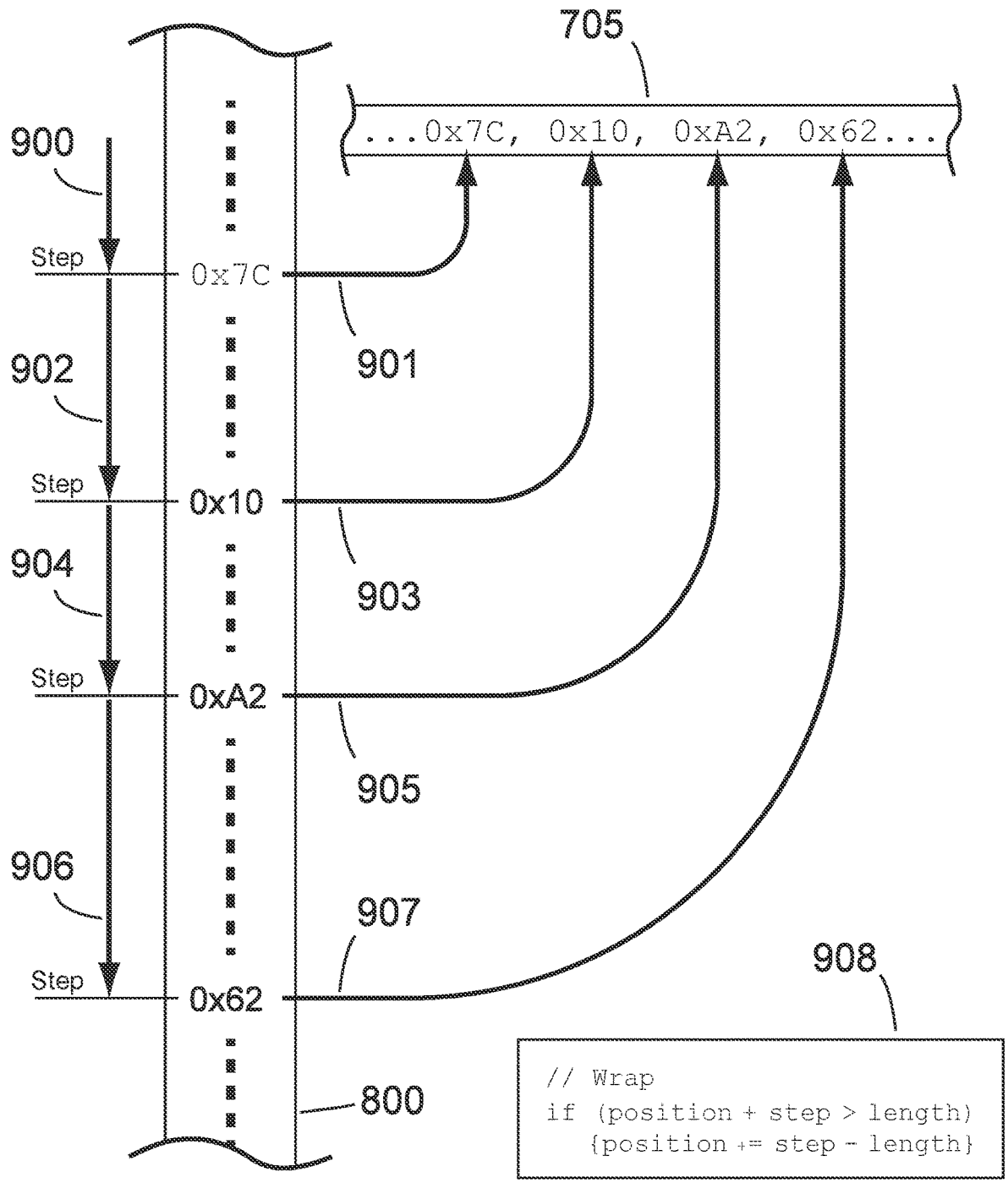
FIG. 9 is a schematic illustration depicting an exemplary sequence of operations in the collection method of a unique subset of true random data, according to an embodiment.

FIG. 9 is an illustration depicting in greater detail the cumulative value of position determined with each new step generated by PRNG 801 in FIG. 8. As shown, step 900 is added to a previous cumulative position stored in temporary storage 802 in FIG. 8. The value at the new cumulative position in the block of true random data 800 (i.e., 0x7C) is copied in step 901 and appended to the unique subset of true random data 705. The new cumulative position reached in step 900 is stored in temporary storage 802 in FIG. 8 thereby replacing the previous cumulative position. As shown, step 902 is added to the previous cumulative position reached in step 900. The value at the new cumulative position in the block of true random data 800 (i.e., 0x10) is copied in step 903 and appended to the unique subset of true random data 705. Collection of the unique subset of true random data 705 continues with steps 904 and 906 as shown. The values at each new cumulative position in the block of true random data 800 (i.e., 0xA2 and 0x62) are copied in steps 905 and 907 respectively, and appended to the unique subset of true random data 705. Wrapping function 908 of calculation component 803 in FIG. 8 determines if a next step will result in a cumulative position beyond the end of the block of true random data 800, then calculates a wrapped new position.

Optimal size is a parameter of particular importance in the dynamic model and determines the number of data elements of a first set of data into which a data object is divided. In an exemplary embodiment, a compressed data object having a size not less than an exemplary predetermined minimum size but less than an exemplary predetermined optimal size comprises a first set of data elements consisting of a single data element. In an exemplary embodiment, a compressed data object having a size less than an exemplary predetermined maximum size but not less than an exemplary predetermined optimal size is divided into a first set of data elements consisting of multiple data elements.

Figure 10:
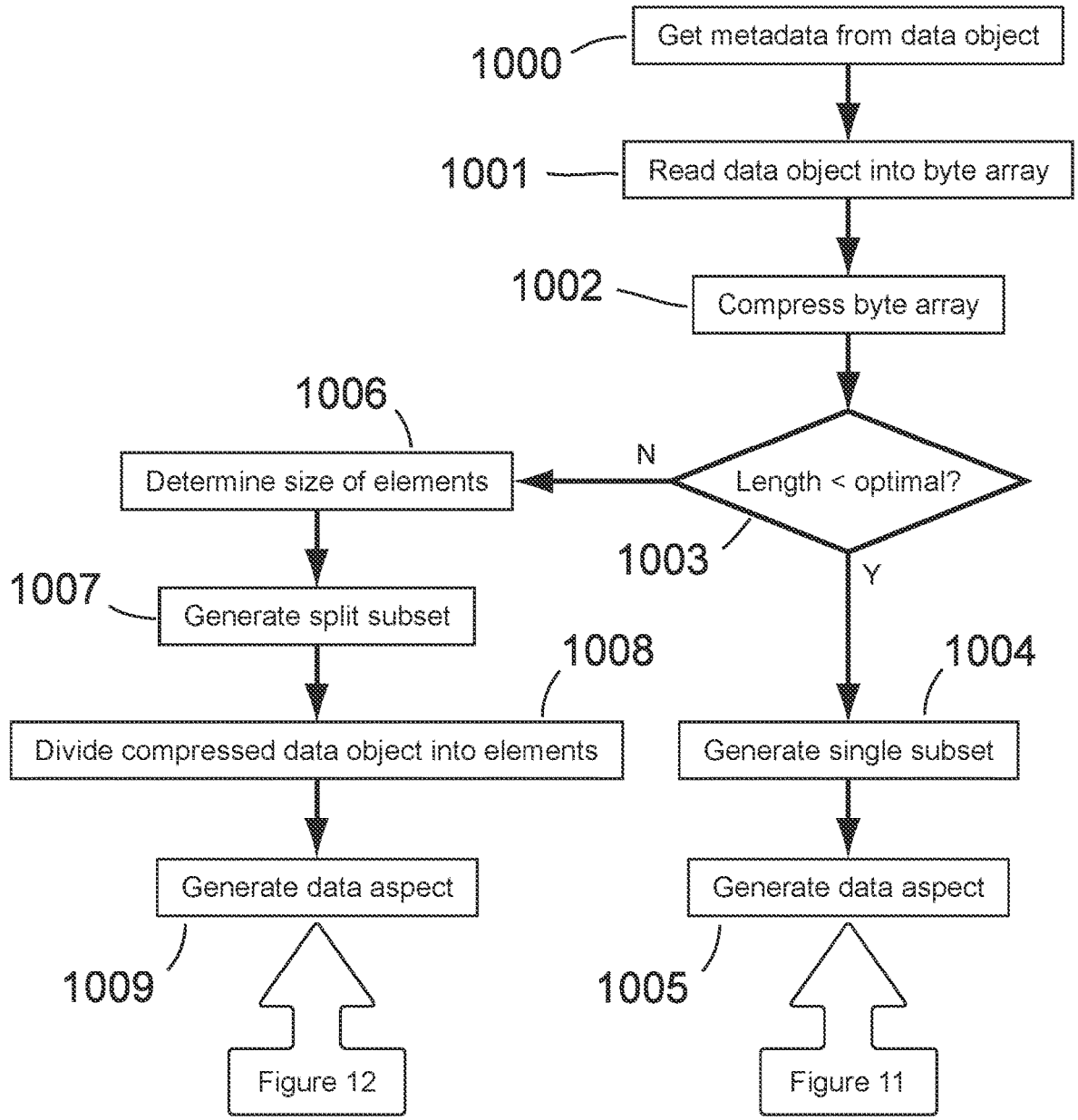
FIG. 10 is a flow diagram of steps in an exemplary method of generating data aspects corresponding to data objects with differing dimensions, according to an embodiment.

FIG. 10 is a flow diagram of the unique subset collection step 603 in FIG. 6 that is used in the generation of data aspect 605 in FIG. 6. Metadata 602 from data object 600 in FIG. 6 is received in step 1000. The data object is prepared for data compression in step 1001. In an exemplary embodiment, data compression may be performed in step 1002 by an instance of Zstandard (i.e., zstd), the lossless data compression algorithm. The size of the compressed data object is compared to an exemplary predetermined optimal length in decision 1003. If the size of the compressed data object is less than an exemplary predetermined optimal length, a single unique subset of true random data is generated in step 1004 substantially equal in length to the compressed data object. If the size of the compressed data object is not less than an exemplary predetermined optimal length, the size of a unique subset of true random data is generated in step 1007 is less than the length of the compressed data object. The unique subset of true random data generated in step 1007 is split into portions, in accordance with the size of data elements into which the compressed data object is divided as determined in step 1006. The compressed data object is divided into multiple data elements of said size in step 1008. The data aspect corresponding to data object 600 in FIG. 6 is generated in either step 1005 or step 1009 in accordance with the dynamic model unique to the data object.

Figure 11:
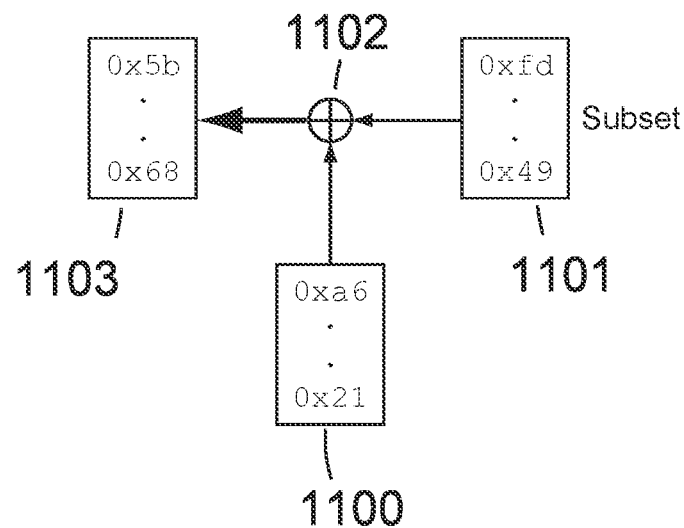
FIG. 11 is a schematic illustration of an example arrangement of a single data element of a compressed data object having a less than exemplary predetermined optimal size and the operation performed together with a single unique subset of true random data in the generation of a data aspect, according to an embodiment.

FIG. 11 is an illustration of the operations comprising generation of the data aspect in step 1005 in FIG. 10. The single unique subset of true random data 1101 generated in step 1004 in FIG. 10 is substantially equal in size to the compressed data object 1100. Addition modulo-2 logical operations 1102 are performed between the unique subset of true random data 1101 and the compressed data object 1100, thereby generating data aspect 1103.

Figure 12:
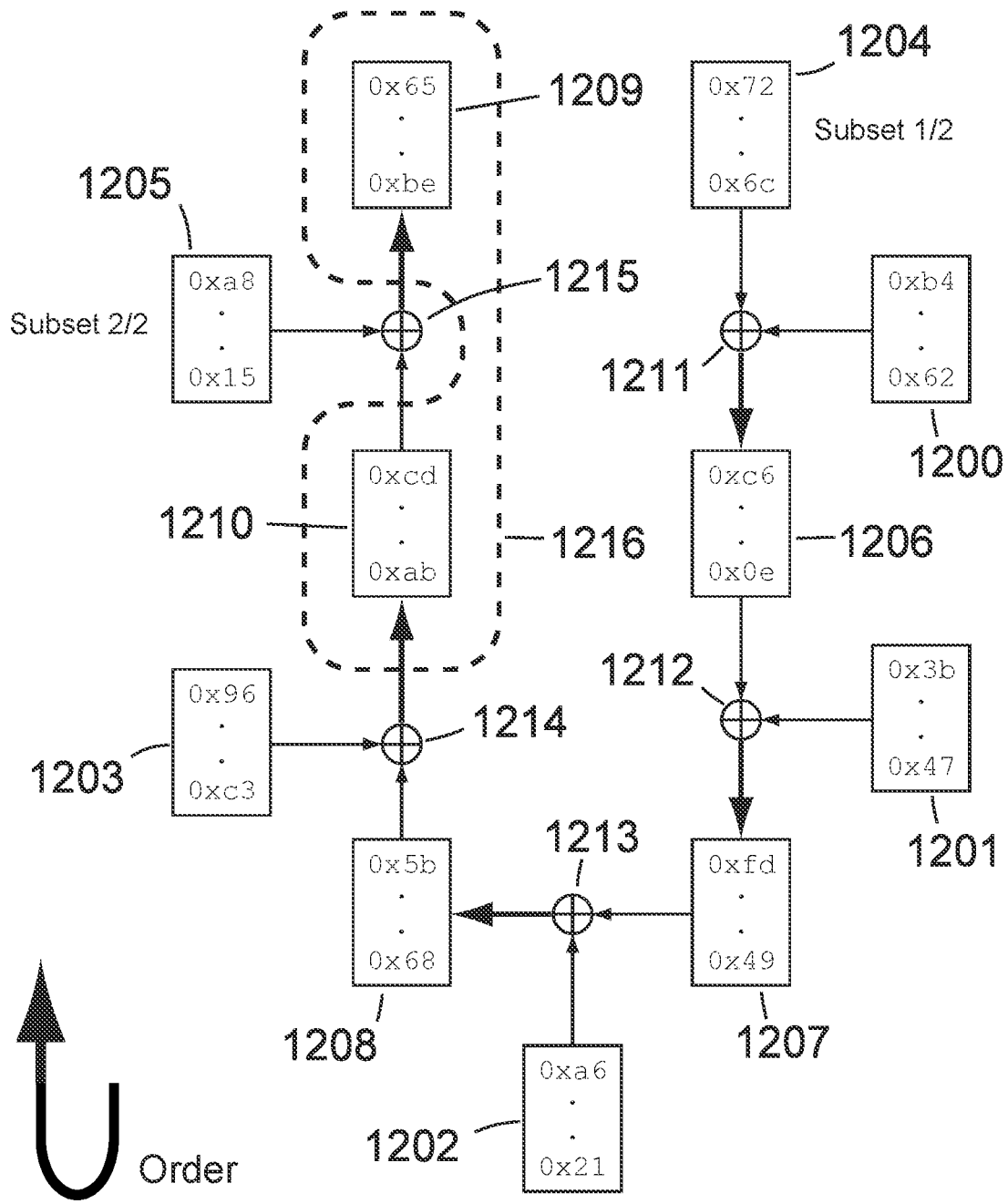
FIG. 12 is a schematic illustration of a compressed data object having a not less than an exemplary predetermined optimal size divided into multiple data elements of a first set of data elements then arranged into cyclic order and the successive operations performed between adjacent data elements together with a split unique subset of true random data in the generation of a second set of data elements to be collected as a single data aspect, according to an embodiment.

FIG. 12 is an illustration of the operations comprising generation of the data aspect in step 1009 in FIG. 10. The compressed data object is divided into data elements of size determined in step 1006 in FIG. 10. In an exemplary embodiment, the unique subset of true random data generated in step 1007 in FIG. 10 is divided into portions 1204 and 1205 each having a size substantially equal to the size of each data element into which the compressed data object was divided. Four data elements 1200-1203 of the determined size comprise a first set of data elements arranged in cyclic order as shown. Addition modulo-2 logical operations 1211 are performed between the first data element of compressed data object 1200 and the first portion of the unique subset of true random data 1204 to generate the first data element 1206 of a second set of data. Addition modulo-2 logical operations 1212 are performed between the said first data element 1206 of the said second set of data elements and the second data element 1201 of the compressed data object to generate the second data element 1207 of the said second set of data elements. Addition modulo-2 logical operations 1213 are performed between the said second data element 1207 of the said second set of data elements and the third data element 1202 of the compressed data object to generate the third data element 1208 of the said second set of data elements. Addition modulo-2 logical operations 1214 are performed between the said third data element 1208 of the said second set of data elements and the fourth data element 1203 of the compressed data object to generate the temporary fourth data element 1210 of the said second set of data elements. Addition modulo-2 logical operations 1215 are performed between the said temporary fourth data element 1210 of the said second set of data elements and the second portion of the unique subset of true random data 1205 to generate the fourth data element 1209 of the said second set of data elements. The generated set of four data elements 1206-1209 of the said second set of data elements are collected into a single data aspect. In exemplary embodiments, addition modulo-2 logical operations 1215 are terminal operations. The set of data elements 1216 is associated with the said terminal operations between the said generated temporary fourth data element 1210 of the said second set of data elements and the said second portion of the unique subset of true random data 1205.

Those skilled in the art will understand that division of a compressed data object into four data elements and the arranging of data elements into cyclic order as shown in FIG. 12, is illustrative and representative only and should not be interpreted in a limiting way by rigidly specifying the size of data elements or the order in which data elements are arranged. In an exemplary embodiment, successive addition modulo-2 logical operations performed between data elements arranged in cyclic order are associated with a unique subset of true random data divided into multiple portions.

The size of a data object following data compression step 1002 in FIG. 10 may vary considerably in practice. Several different strategies may be implemented to determine the number and size of data elements into which the compressed data object is divided in step 1006 in FIG. 10, and the size of each unique subset of true random data or portion thereof, determined in step 1007 FIG. 10. The chosen strategy becomes protocol and followed by both the host computer software application executing steps to generate data aspects and the browser-like client computer software application executing steps to resolve data aspects and generate data objects. By way of example and not limitation, FIGS. 13 and 14 illustrate an exemplary strategy in which aspects of the present invention may be achieved.

Figure 13:
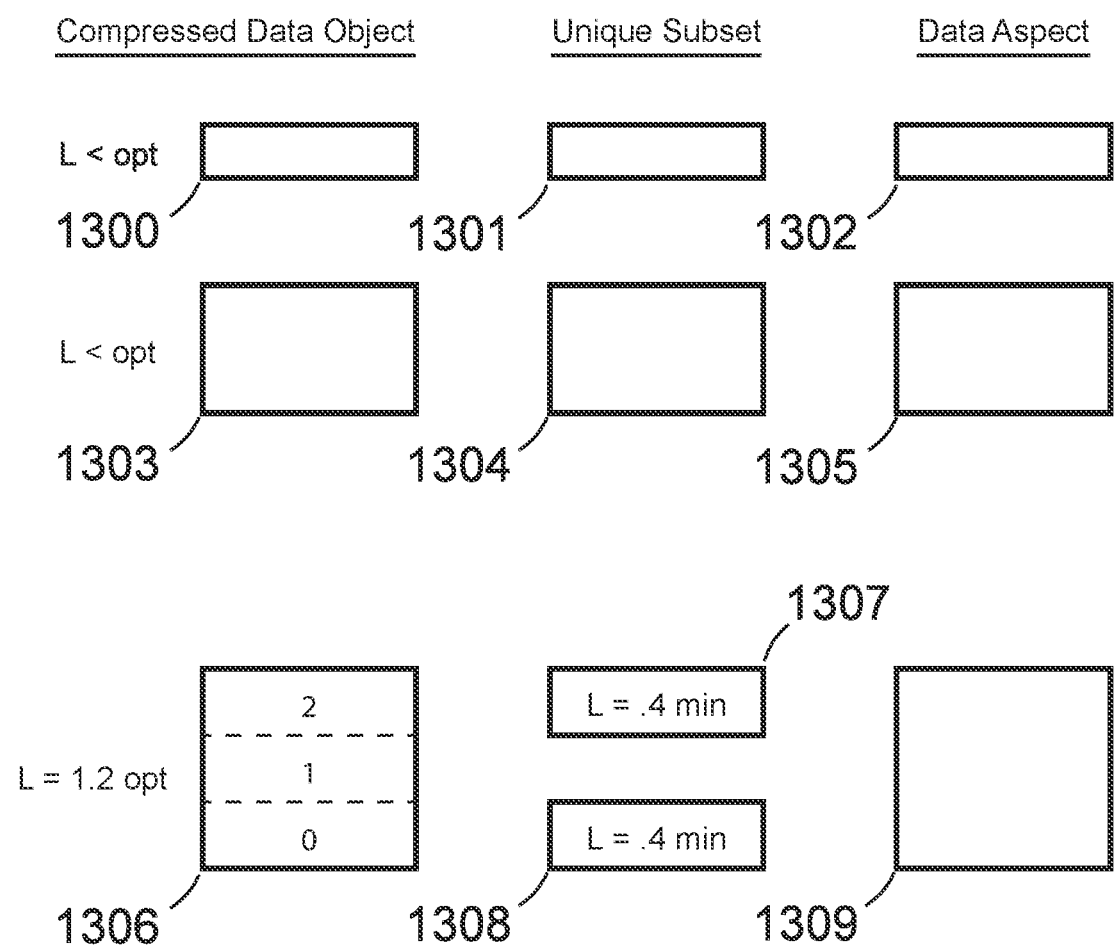
FIG. 13 is an illustration of an exemplary strategy for compressed data objects having a size less than an exemplary predetermined optimal size and for compressed data objects having a size not less than an exemplary optimal size which can be evenly divided into data elements, according to an embodiment.

FIG. 13 illustrates an exemplary strategy in which compressed data object 1300 having a size less than an exemplary predetermined optimal size is therefore processed as a single data element. Unique subset of true random data 1301 having a size substantially equal to said single data element of the compressed data object 1300 is collected in a step corresponding to step 1004 in FIG. 10. Addition modulo-2 logical operations corresponding to operations 1102 in FIG. 11 are performed between said single data element of the compressed data object 1300 and said unique subset of true random data 1301 to generate data aspect 1302. Similarly, compressed data object 1303 having a size greater than compressed data object 1300 but still less than an exemplary predetermined optimal size is also processed as a single data element. Unique subset of true random data 1304 having a size substantially equal to said single data element of the compressed data object 133 is also collected in a step corresponding to step 1004 in FIG. 10. Addition modulo-2 logical operations corresponding to operations 1102 in FIG. 11 are performed between said single data element of the compressed data object 1303 and said unique subset of true random data 1304 to generate data aspect 1305. Compressed data object 1306 having a size not less than an exemplary predetermined optimal size as determined by decision 1003 in FIG. 10 is be divided into data elements of sizes determined in step 1006 in FIG. 10. As shown, compressed data object 1306 may be divided into three data elements (i.e., 0, 1 and 2) of substantially equal size. A split unique subset of true random data is collected in a step corresponding to step 1007 in FIG. 10. Data elements of the compressed data object 1306 are arranged in cyclic order and addition modulo-2 logical operations performed together with portions of said unique subset of true random data 1307 and 1308 may be compared with those in the diagram FIG. 12.

Figure 14:
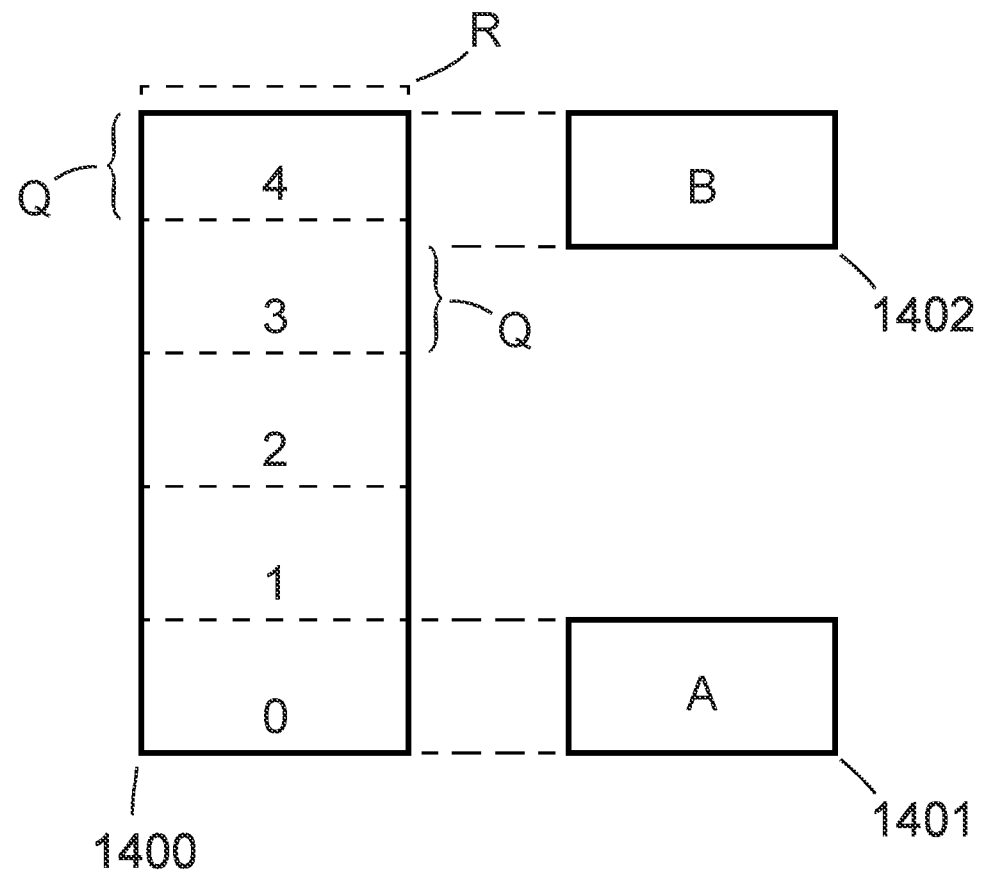
FIG. 14 is an illustration of an exemplary strategy for compressed data objects having a size not less than an exemplary predetermined optimal size which cannot be divided into data elements of equal size, according to an embodiment.

FIG. 14 illustrates an exemplary strategy in which compressed data object 1400 having a size not less than an exemplary predetermined optimal size as determined by decision 1003 in FIG. 10 is divided into data elements of unequal sizes determined in step 1006 in FIG. 10. As shown, compressed data object 1400 may be divided into four data elements (i.e., 0, 1, 2 and 3) of substantially equal size, and a fifth data element (i.e., 4) of lesser size Q. A split unique subset of true random data is collected in a step corresponding to step 1007 in FIG. 10. As shown, portions of true random data 1401 and 1402 (i.e., A and B) each correspond in size to that of the four data elements of equal size. Successive addition modulo-2 logical operations are performed between data elements arranged in cyclic order as illustrated in FIG. 12. The end of data element 4 will be reached before operations between data element 4 and the whole of data element 3 can be completed, by an amount R. An exemplary strategy may specify that the operation between data elements 3 and 4 of the compressed data object will then be complete. The second portion 1402 of true random data (i.e., B) is equal to the sum of size Q and amount R and will therefore overlap data element 3 by amount R, as shown.

True random numbers must be obtained from a source known to produce them, one having a fundamentally unpredictable output, and is referred to as an entropy device in the present disclosure. In an exemplary embodiment, the entropy device may be a quantum random number generator. True random numbers collected from the entropy device are ergodic. Every subsequence is representative of the whole block and equally unpredictable. Tests can detect non-randomness in a block of data obtained from other sources, if it is large enough to satisfy the test. However, no test can guarantee a given block of data is truly random. Therefore, an entropy device controlled by the host computer is used to generate blocks of true random numbers in the present invention. Within the present disclosure the term "characteristically random data" refers to data that is characteristically indistinguishable from data produced by the entropy device. However, because characteristically random data does not originate from the entropy device, the term is applied to distinguish the results of computationally irreducible operations from true random data obtained directly from the entropy device. In further contrast, a PRNG is a deterministic algorithmic source producing a probabilistic stream of random numbers by essentially extending an initialization seed. PRNG output is not collected by the present invention, and is only used to select from a set of items having a far smaller period. PRNG output is also used by the present invention in a composite of computationally irreducible processes operative upon a block of true random data.

Figure 15:
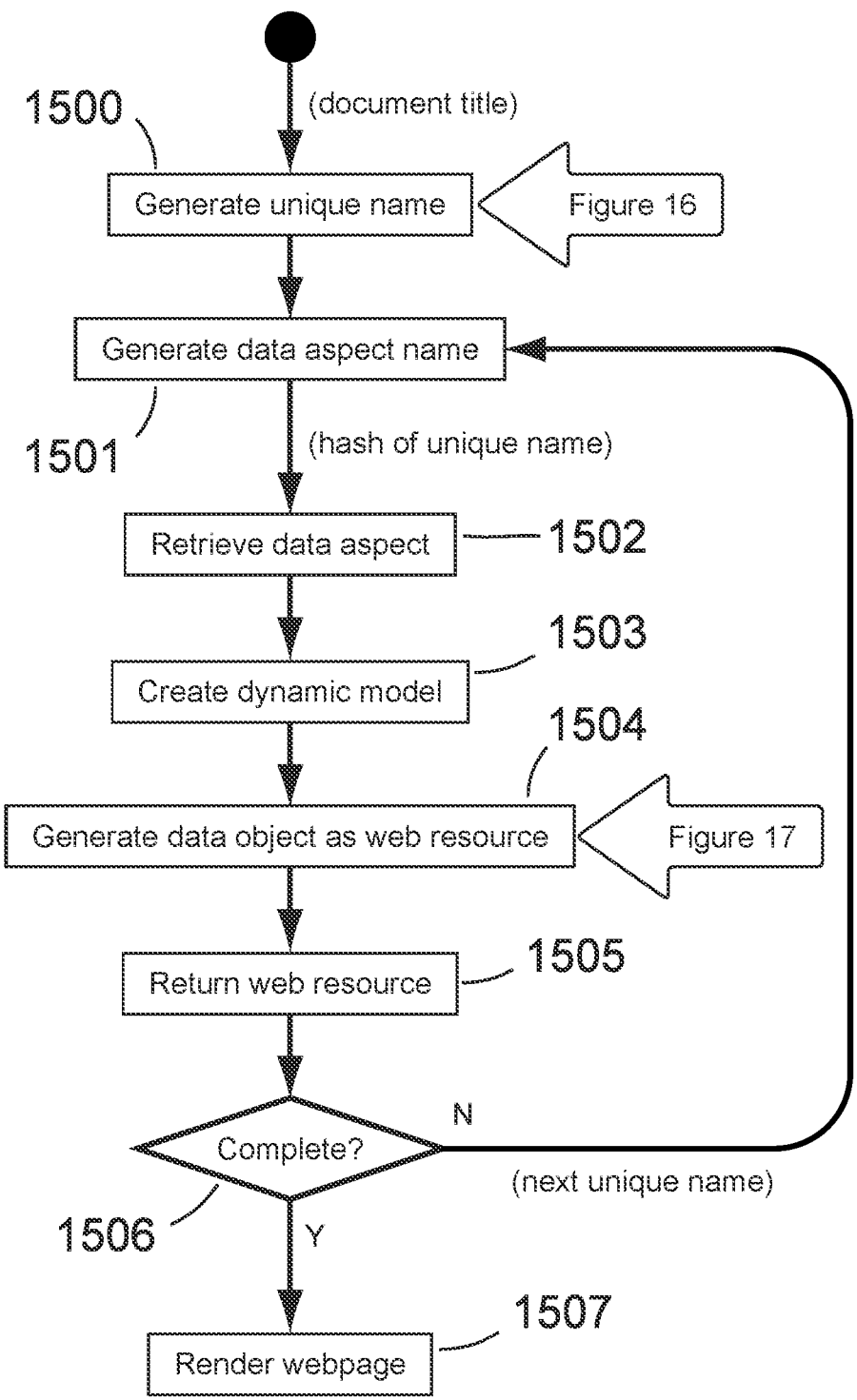
FIG. 15 is a flow diagram of steps in an exemplary method of rendering a webpage comprising at least one web resource resolved from emergent web spaces, according to an embodiment.

FIG. 15 is a flow diagram of the steps performed by a software application executing on a client computer in resolving a webpage from emergent web spaces. A document title is used to generate a unique name in step 1500. The data aspect name is generated in step 1501 from a hash of the unique name. The data aspect is retrieved from a remote data storage device in step 1502. The name and size of the data aspect are parameters of a dynamic model created in 1503. In accordance with the dynamic model, a data object is generated in step 1504, as a web resource. A determination is made in decision 1506 if references to additional resources remain, the additional resources are each resolved in turn. The webpage is fully rendered in 1507, after all web resources have been returned.

Figure 16:
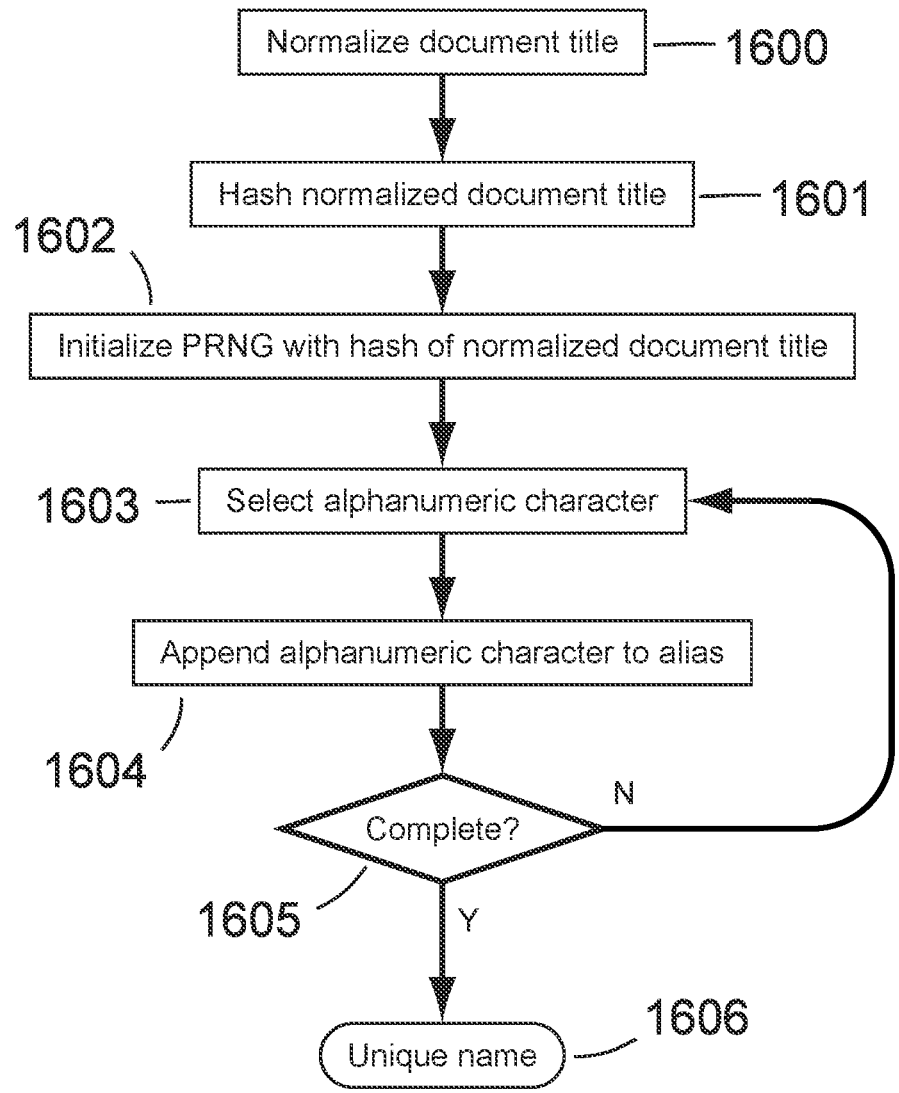
FIG. 16 is a flow diagram of steps illustrating in further detail an exemplary method of generating a unique name corresponding to a document title, according to an embodiment.

FIG. 16 is a flow diagram of steps to generate a unique name 1606 from a document title, performed by the software application executing on a client computer, and serves to explain in greater detail step 1500 in FIG. 15. Steps performed by a software application executing on a client computer are comparable to the exemplary naming scheme in FIG. 2, performed by a software application executing on the host computer. The document title is first normalized in an equivalent step 1600 to that illustrated by 205 in FIG. 2. A cryptographic hash performed in step 1601 is equivalent to the cryptographic hash performed by a software application executing on the host computer. In step 1602, a PRNG is initialized with the output of the cryptographic hash of the normalized document title. A PRNG implemented by a software application executing on a client computer is equivalent to the PRNG implemented by a software application executing on the host computer in FIG. 2. An alphanumeric character is selected from a predetermined list of alphanumeric characters in step 1603. Iteratively selected characters are appended to the alphanumeric alias in step 1604, equivalent to functional loop 206 in FIG. 2. In decision 1605, a determination is made if the predetermined length of the alphanumeric alias is achieved.

Figure 17:
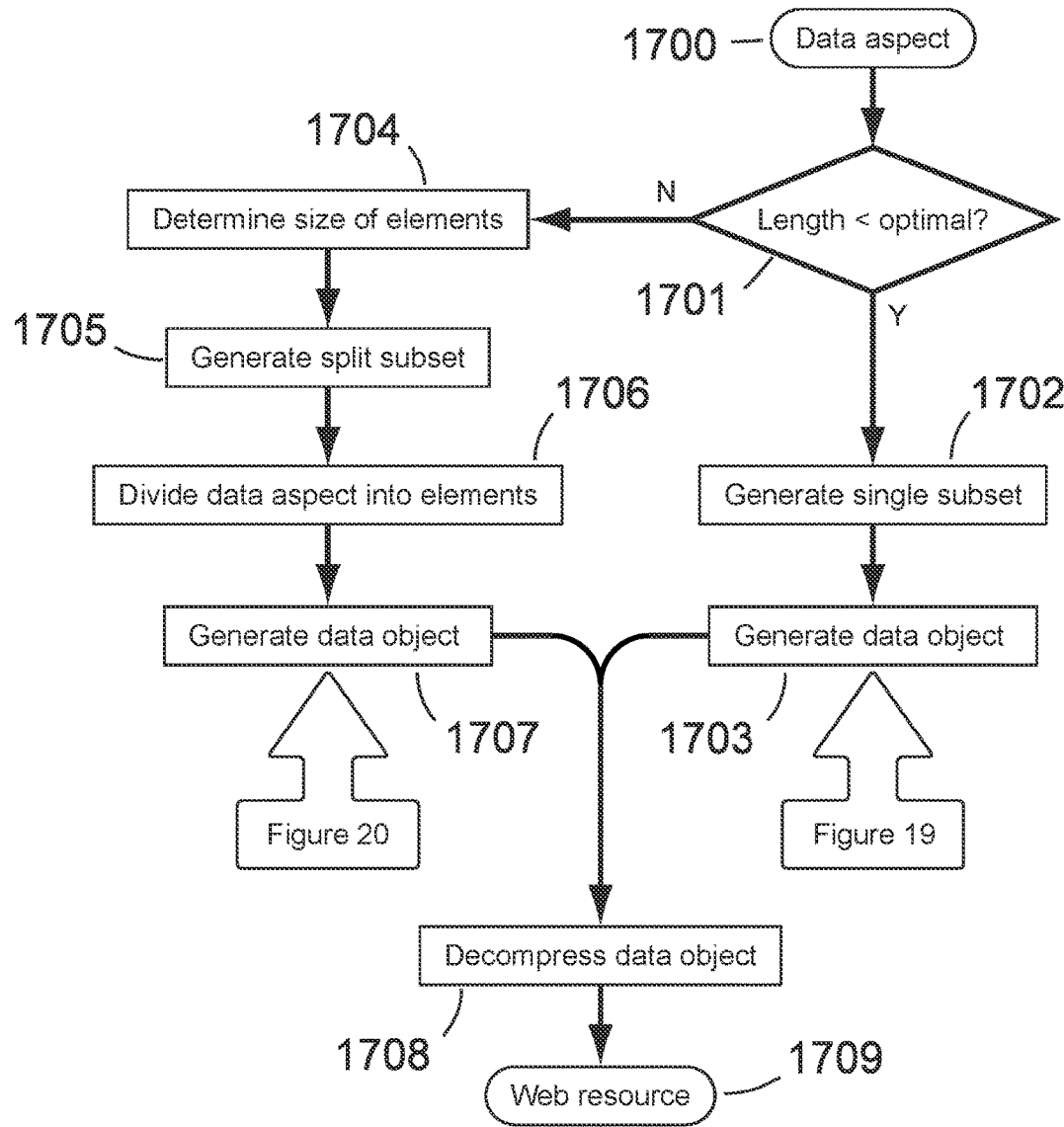
FIG. 17 is a flow diagram of steps illustrating in further detail an exemplary method of generating a data object as a web resource, according to an embodiment.

FIG. 17 is a flow diagram of details of steps to generate a data object as a web resource from data aspect 1700, by a software application executing on a client computer, and serves to explain in greater detail step 1504 in FIG. 15. In accordance with the dynamic model, if the size of a data aspect is determined in decision 1701 to be less than an exemplary predetermined optimal size, a single unique subset of true random data is generated in step 1702, comparable to step 1004 in FIG. 10 as performed by a software application executing on the host computer. A compressed data object is generated in step 1703 by operations between data aspect 1700 and the single unique subset of true random data. If the size of a data aspect is determined in decision 1701 to be not less than an exemplary predetermined optimal size, a unique subset of true random data comprising two portions is generated in step 1705, comparable to step 1007 in FIG. 10 as performed by a software application executing on the host computer. In accordance with the dynamic model, the data aspect is divided into data elements of a first set of data elements in step 1706. A second set of data elements are generated from the first set of data elements and the unique subset of true random data comprising two portions. The second set of data elements are collected as a single compressed data object in step 1707. Data decompression is performed on the compressed data object in step 1708, thereby generating 1709 substantially identical to an original web resource.

Figure 18:
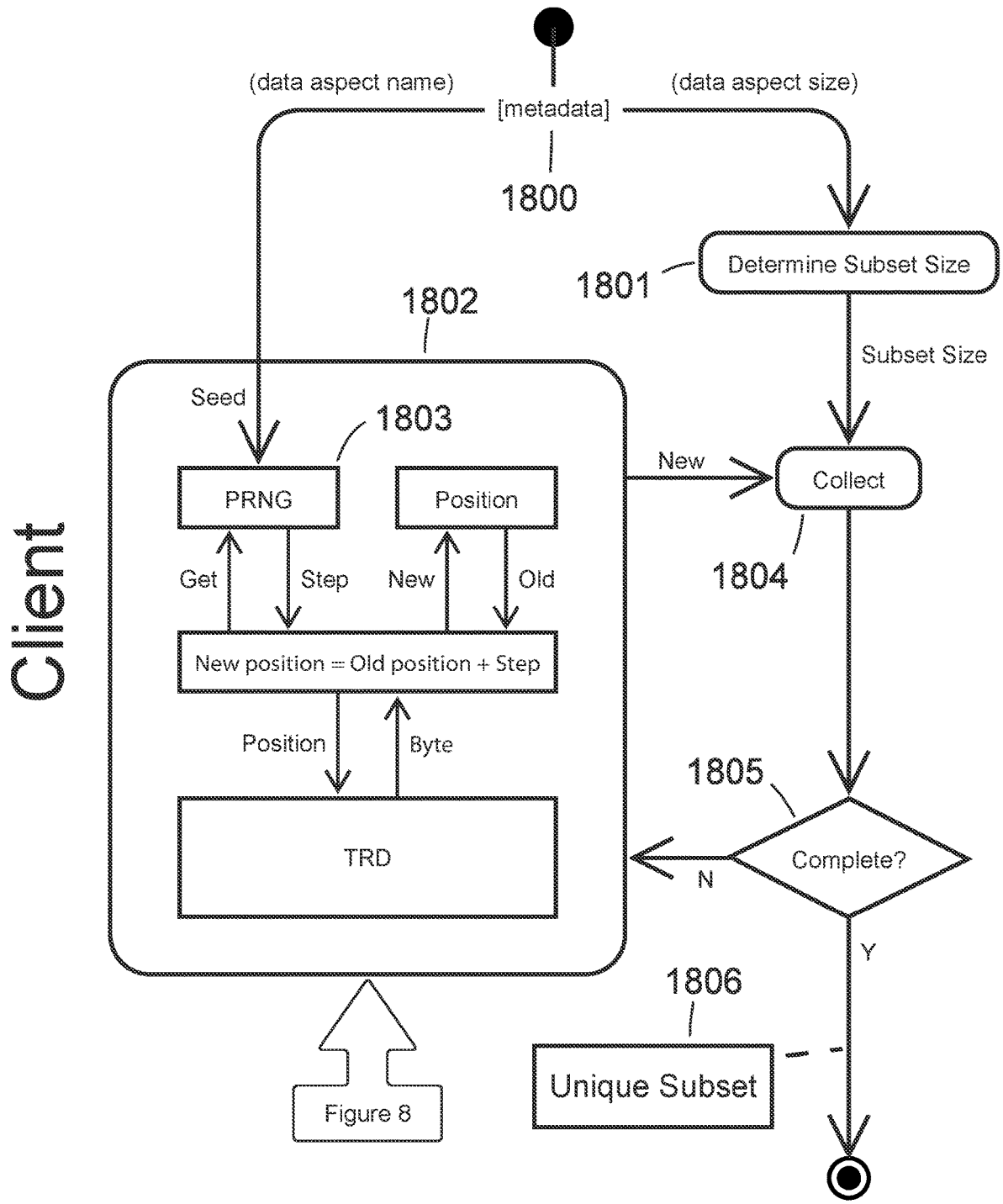
FIG. 18 is a flow diagram of steps comprising an exemplary collection method of a unique subset of true random data, according to an embodiment.

FIG. 18 is a flow diagram illustrating in greater detail the unique subset collection steps 1702 and 1705 in FIG. 17. Metadata 1800 contains both the name and the size of a data aspect. The size of a unique subset of true random data to be collected is determined in step 1801. In an exemplary embodiment, a unique subset of true random data may be collected that is equal in length to the size of the data aspect when the size of the data aspect is less than an exemplary predetermined optimal length. In an exemplary embodiment, a unique subset of true random data may also be collected that is smaller than the size of the data aspect. The size of the unique subset of true random data determined in step 1801 is input to collection step 1804. Activity diagram 1802 shows components of unique subset collection and is comparable to activity diagram 702 in FIGS. 7 and 8, performed by a software application executing on the host computer. The name of the data aspect is used to initialize the PRNG component 1803 within unique subset collection activity diagram 1802. The cryptographic hash performed is equivalent to PRNG 801 in FIG. 8, performed by a software application executing on the host computer. Decision 1805 determines when the size of the unique subset of true random data 1806 is equal to the size predetermined in step 1801.

Figure 19:
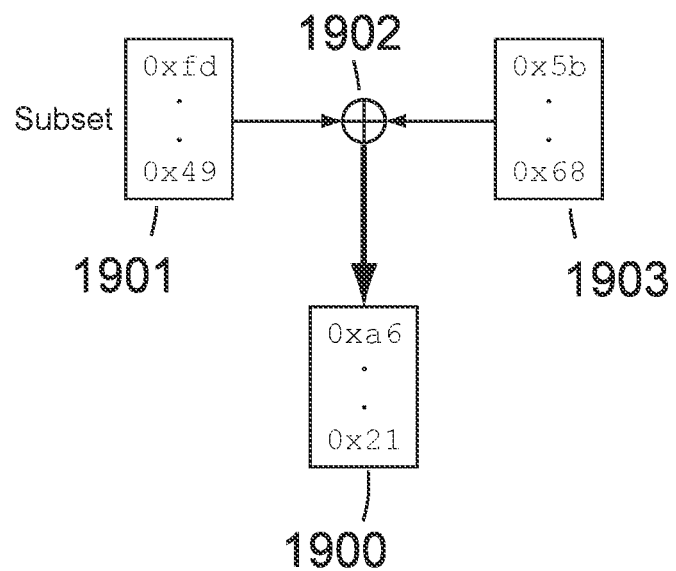
FIG. 19 is a schematic illustration of an example arrangement of a single data element of a data aspect having a less than exemplary predetermined optimal size and the operation performed together with a single unique subset of true random data in the generation of a compressed data object, according to an embodiment.

FIG. 19 is an illustration of the operations comprising generation of a data object, performed by a software application executing on a client computer, in further detail of step 1703 in FIG. 17. Data aspect 1903 may be retrieved from a remote data storage device by the same software application executing on a client computer, corresponding to data aspect 1103 in FIG. 11. In accordance with a dynamic model, the single unique subset of true random data 1901 is generated by the same software application executing on the client computer and substantially equal in size to the data aspect 1903. Addition modulo-2 logical operations 1902 are performed, by the same software application executing on the client computer, between the unique subset of true random data 1901 and data aspect 1903 to generate compressed data object 1900 substantially identical to compressed data object 1100 in FIG. 11.

Figure 20:
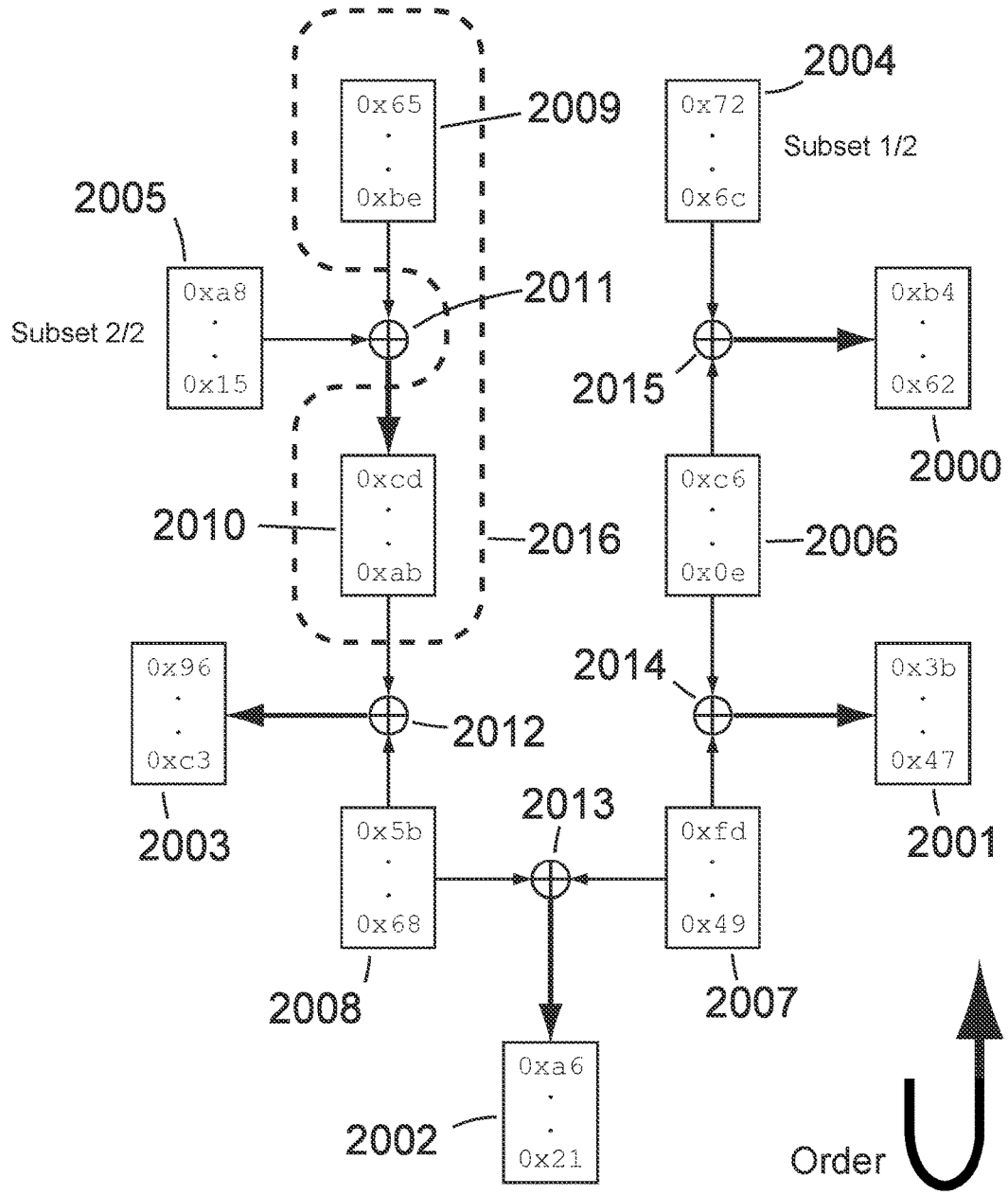
FIG. 20 is a schematic illustration of a data aspect having a not less than exemplary predetermined optimal size divided into multiple data elements of a first set of data elements then arranged into cyclic order and the successive operations performed between adjacent data elements together with a split unique subset of true random data in the generation of a second set of data elements to be collected as a single compressed data object, according to an embodiment.

FIG. 20 is an illustration of the operations comprising generation of a data object, performed by a software application executing on a client computer, in further detail of step 1707 in FIG. 17. A data aspect may be retrieved from a remote data storage device by the software application executing on the client computer, corresponding to the single data aspect assembled from the generated set of four data elements 1206-1209 of the second set of data elements in FIG. 12. In accordance with the dynamic model, the data aspect is divided into a first set of data elements 2006-2009 in step 1706 in FIG. 17, by the same software application executing on the client computer, then arranged in cyclic order as shown. Addition modulo-2 logical operations 2011 are performed between the fourth and last data element of the data aspect 2009 and the second portion of the unique subset of true random data 2005 to generate a temporary last data element 2010 of a second set of data elements. The set of data elements 2016 and operation 2011 correspond to the set of data elements 1216 and a reverse of terminal operation 1215 in FIG. 12. Addition modulo-2 logical operations 2012 are performed between the said temporary last data element 2010 of a second set of data elements and the third data element of the data aspect 2008 to generate the fourth and last data element 2003 of the second set of data elements. Addition modulo-2 logical operations are performed in reverse cyclic order between adjacent data elements of the divided data aspect to generate successive data elements of the second set of data elements, as shown. The first data element 2000 of the second set of data elements is replaced by the results addition modulo-2 logical operations 2015 performed between the said first data element of the second set of data elements and the first portion of the unique subset of true random data 2004. Data elements 2000-2003 of the second set of data elements may be collected into a single compressed data object corresponding to step 1707 in FIG. 17.

Figure 21:
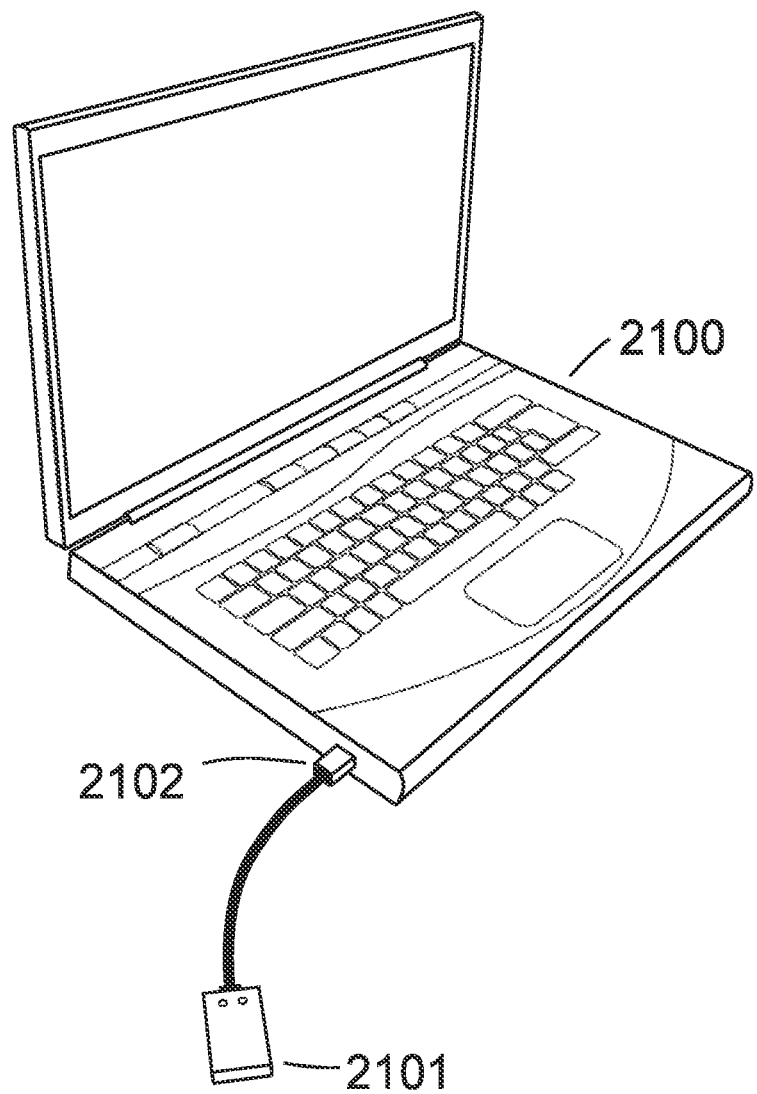
FIG. 21 is a schematic illustration of an exemplary suitable host computer together with an exemplary entropy device in which aspects of the invention may be implemented, according to an embodiment.

FIG. 21 depicts an exemplary embodiment in which entropy device 2101 is locally connected to a host computer 2100 at a common interface 2102. Exemplary interfaces include, but are not limited to, Universal Serial Bus (i.e., USB), Serial AT Attachment (i.e., SATA), Small Computer System Interface (i.e., SCSI), and the like, and/or any medium that allows data to be physically transferred through serial or parallel communication channels (e.g., copper wire, optical fiber, computer bus, and the like). Host computer 2100 may be any computing device, such as a laptop computing device, tablet computing device, desktop computing device, personal computer, server computing device, and the like. Entropy device 2101 is shown physically connected to host computer 2100, but may be detached from the same host computer, even reattached to a different host computer not shown.

Entropy device 2101 is a local source of entropy. True random data may be requested from the device by a software application executing on the host computer 2100. The entropy source can be classical such as thermal noise, or it can be quantum. Classical sources are affected by their environment and may not be entirely correctable by post-processing. An exemplary device may harness random fluctuations in light, also called "quantum shot noise," that are purely of a quantum origin and therefore fundamentally random and unpredictable. A System-On-a-Chip (i.e., SOC) device can integrate extraction, filtering and digitization means. Entropy device 2101 may further incorporate non-volatile memory means for storing one or more blocks of true random data. Separate storage means may also be an emergent file system.

Figure 22:
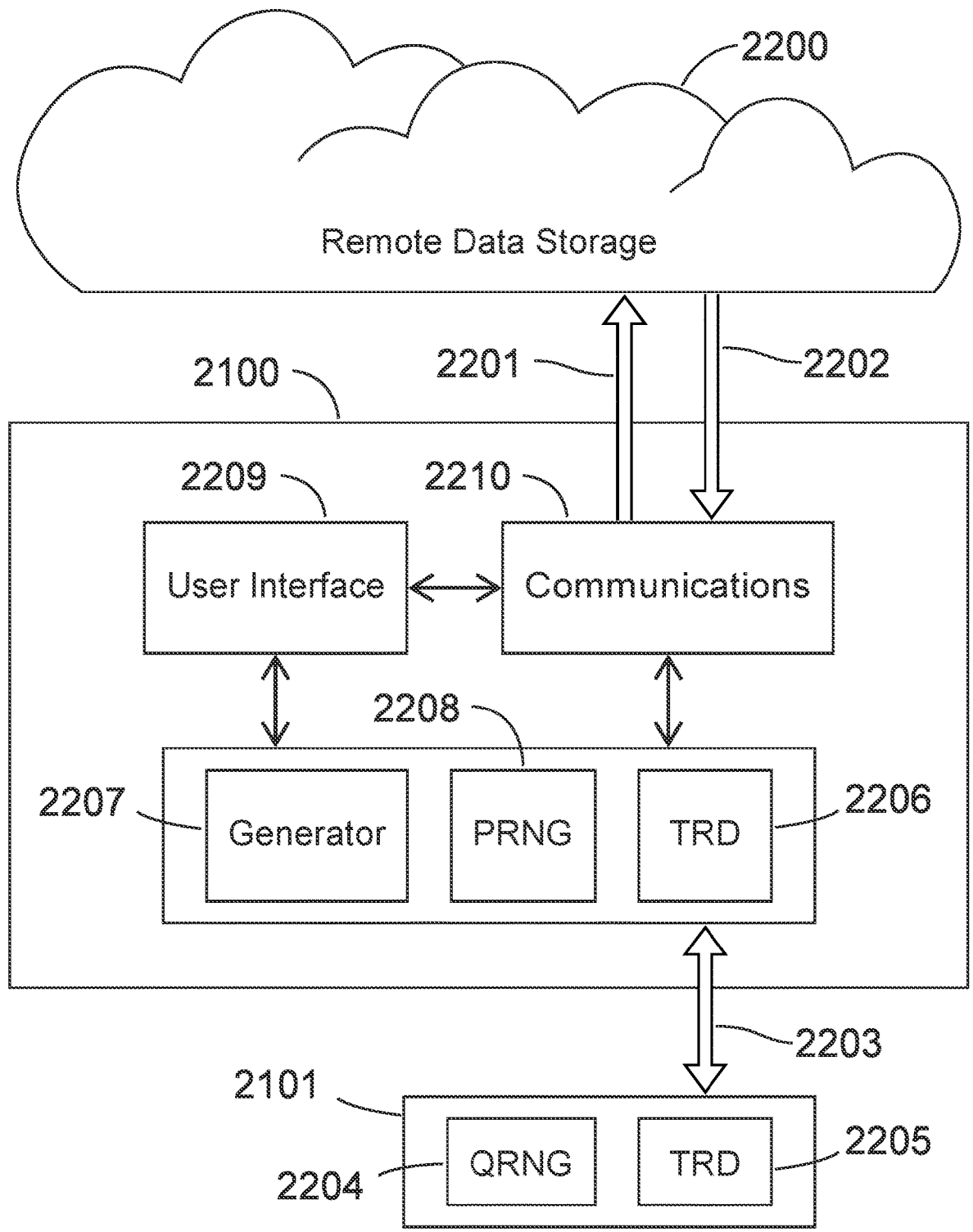
FIG. 22 is a schematic block diagram illustrating selected components of an exemplary host computer together with an exemplary entropy device and the relationship with remote data storage in which aspects of the invention may be implemented, according to an embodiment.

FIG. 22 is a block diagram of an exemplary software application executing on the host computer 2100 together with entropy device 2101 as shown in FIG. 21. It is within the scope of the present invention that remote data storage 2200 may comprise multiple devices in multiple physical locations. Data aspects are transferred to remote data storage 2200 from host computer 2100 along data transfer path 2201 and may be transferred from remote data storage 2200 to host computer 2100 along data transfer path 2202. Data transfer paths are facilitated by communications component 2210 of the host computer 2100. User interface 2209 permits the host computer user to selectively control the separation of a webpage into web resources and data transfer between the host computer 2100 and remote data storage 2200. Application software executing on the host computer 2100 is configured to execute the steps of generating data aspects as presented in FIGS. 6-14. Generator component 2207 executes steps 1005 and 1009 in FIG. 10. Temporary true random data storage 2206 corresponds to 800 in FIG. 8. PRNG component 2208 corresponds to 801 in FIG. 8. Principal components of entropy device 2101 are quantum random number generator (i.e., QRNG) component 2204 and true random data storage device 2205. Other components such as interface components are not shown. True random data and requests for them are transferred between host computer 2100 and entropy device 2101 along data path 2203.

Figure 23:
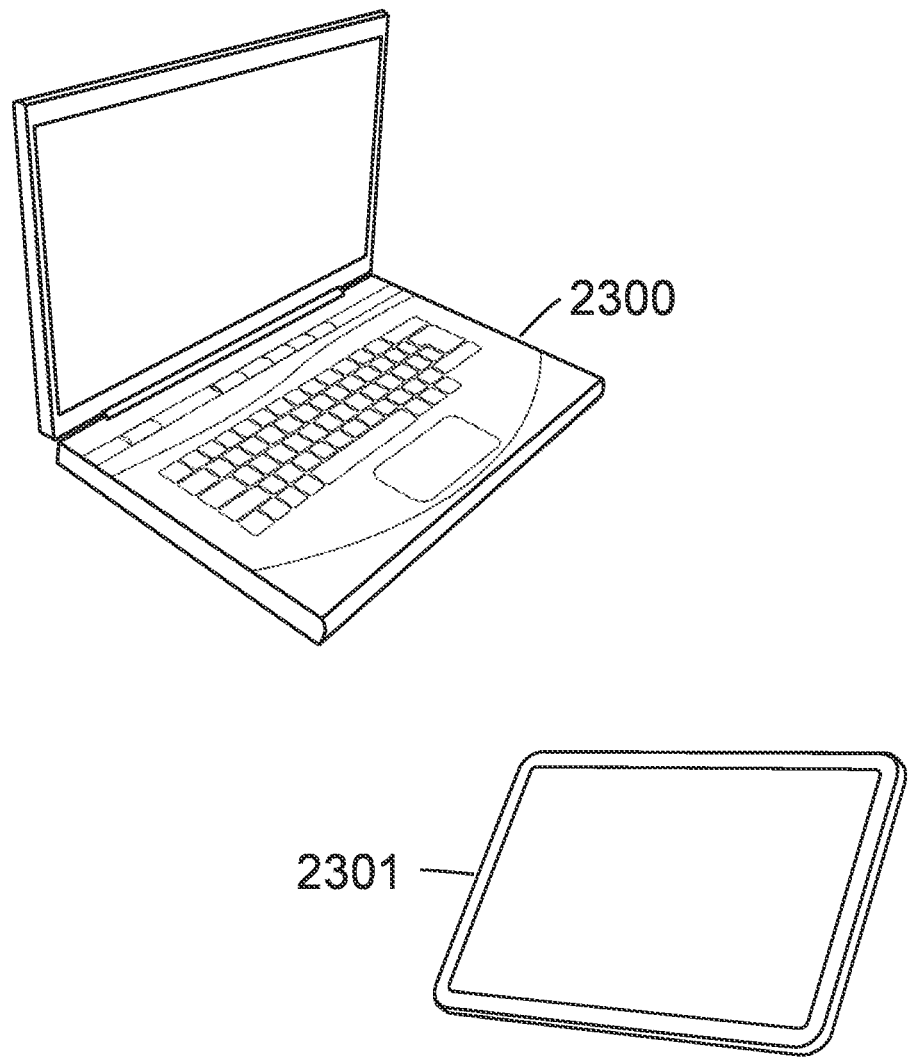
FIG. 23 is a schematic illustration of exemplary suitable client computers in which aspects of the invention may be implemented, according to an embodiment.

FIG. 23 depicts exemplary client computers 2300 and 2301. Client computers may be any computing device, such as a laptop computing device, tablet computing device or smart phone, desktop computing device, personal computer, server computing device, and the like.

Figure 24:
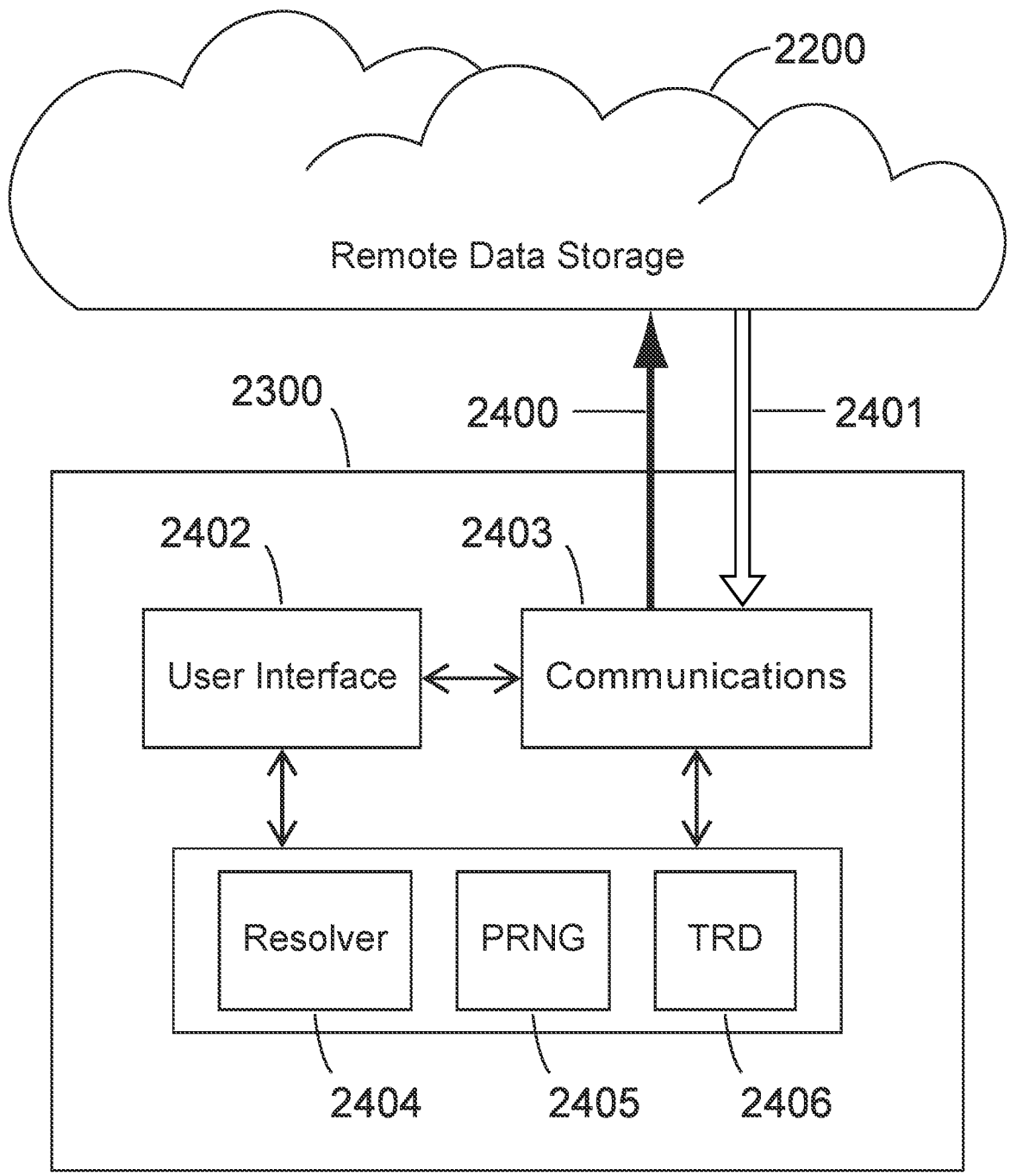
FIG. 24 is a schematic block diagram illustrating selected components of an exemplary client computer and the relationship with remote data storage in which aspects of the invention may be implemented, according to an embodiment.

FIG. 24 is a block diagram of an exemplary software application executing on the client computer 2300 in FIG. 23. It is within the scope of the present invention that remote data storage 2200 may comprise multiple devices in multiple physical locations. Data aspects are requested from remote data storage 2200 by client computer 2300 along data transfer path 2400. Data aspects are transferred to client computer 2300 from remote data storage 2200 along data transfer path 2401. Data transfer paths are facilitated by communications component 2403 of client computer 2300. User interface component 2402 permits the client computer user to selectively resolve data aspects and to render webpages of emergent web spaces. Application software executing on the client computer 2300 is configured to execute the steps of generating data objects as presented in FIGS. 15-20. The browser-like software application executing on client computer 2300 includes but is not limited to Resolver component 2404, PRNG component 2405 and true random data storage component 2406. Resolver component 2404 executes step 1504 in FIG. 15. PRNG component 2405 corresponds to 1803 in FIG. 18. It is within the scope of the present invention that an exemplary software application executing on the host computer 2100 in FIG. 21 is configured to generate instances of an exemplary software application for immediate deployment to the client computer 2300 in FIG. 23, embedding in the generated application software at least a block of true random data for binding to host computer 2100 in FIG. 21.

Figure 25:
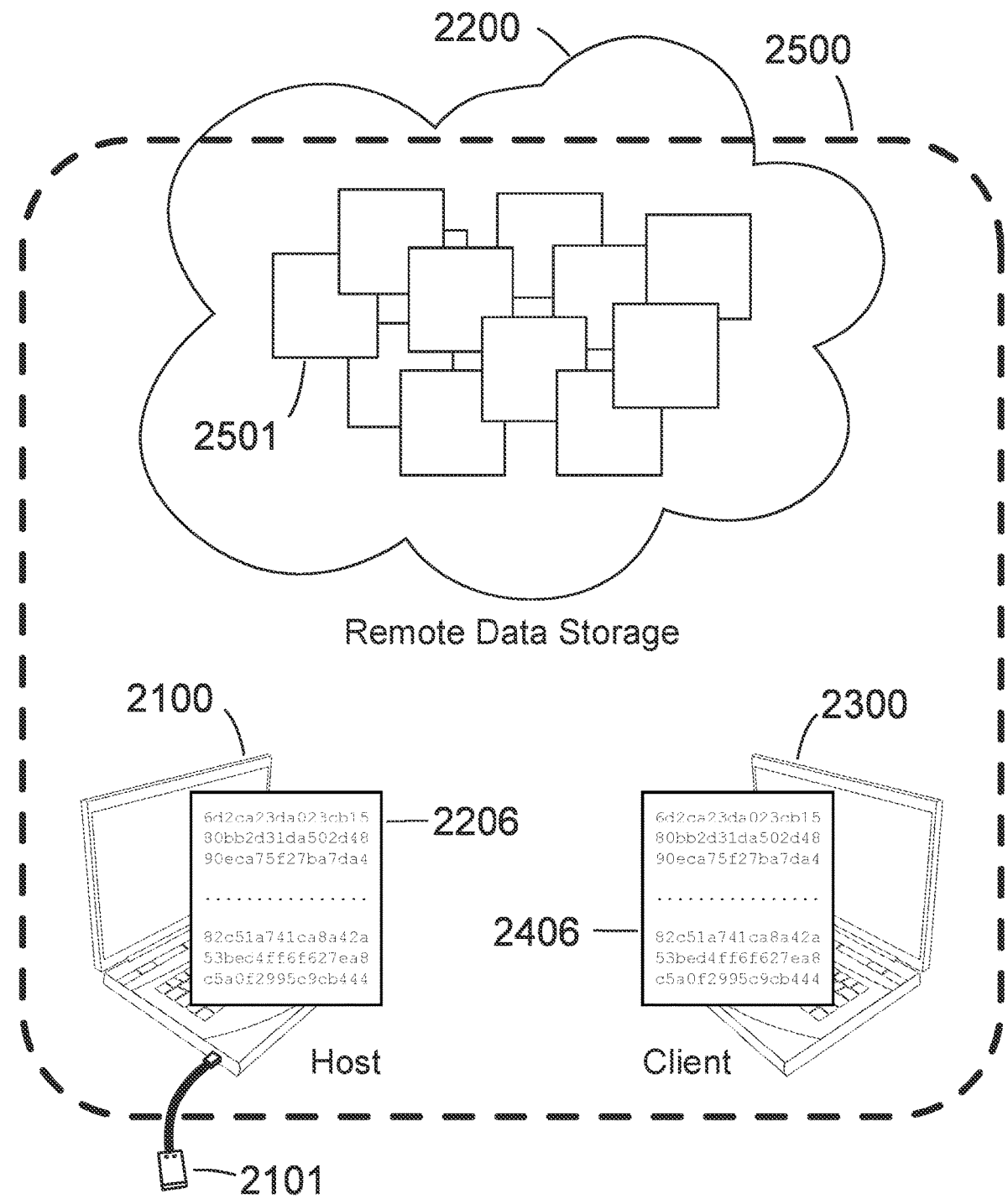
FIG. 25 is a schematic illustration that illustrates the binding relationship between an exemplary host computer and an exemplary client computer established upon at least one block of true random data common to both, together with remote data storage concurrently accessible by each in which aspects of the invention may be implemented, according to an embodiment.

FIG. 25 illustrates zone 2500 composed of a block of true random data common to both host computer 2100 and client computer 2300 (i.e., 2206 in FIGS. 22 and 2406 in FIG. 24, respectively) together with remote data storage 2200. Data aspects (e.g., 2501) are generated by a software application executing on the host computer 2100, transferred to remote data storage 2200 and may be retrieved or deleted by the same software application executing on the host computer 2100. Data aspects (e.g., 2501) are transferred from remote data storage 2200 as requested by the software application executing on the client computer 2300. Remote data storage 2200 may comprise multiple devices in multiple physical locations.

Figure 26:
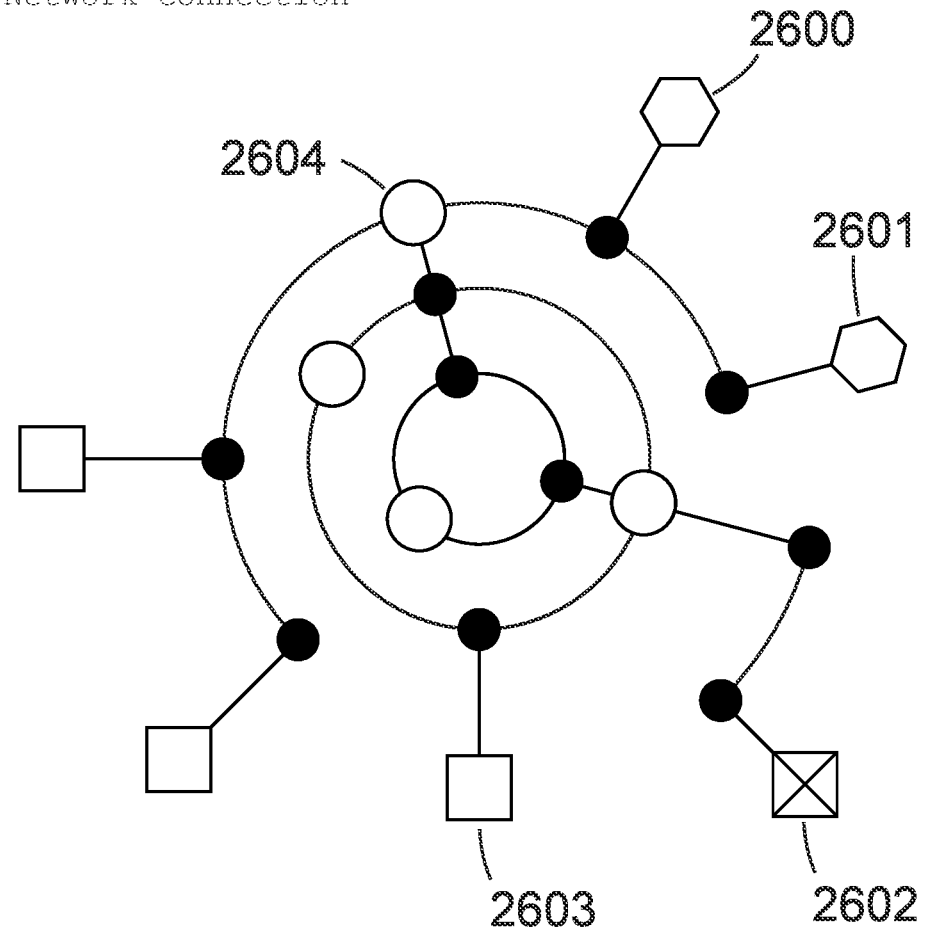
FIG. 26 is a schematic illustration of the relationship between various components and devices in an elementary depiction of Internet architecture, according to an embodiment.

FIG. 26 is a schematic illustration of the relationship between various components and devices in an elementary depiction of Internet architecture, simplified to distinguish key elements for the purpose of contrasting the present invention. DNS server 2604 belongs to a hierarchical system of name servers. A web server administrator at computer 2602 provisions and manages websites served by web servers 2600 and 2601. Access controls alone prevent intruders from assuming the role of administrator. A user at client computer 2603 requests web resources from web server 2600, first providing a domain name to DNS server 2604 to obtain the corresponding IP address.

Conventional technologies typically store web resources in hierarchical file systems on web servers. The name assigned to one web resource (e.g., "index.html") may also be assigned to another document, being distinguished only by its location in the file system. Web servers can be made to return corrupt files, a contributing factor in the distribution of malware. Embodiments of the present invention prevent the introduction of malware since data aspects do not contain information from data objects. Therefore, surreptitious alterations cannot be made. Moreover, because data objects do not have separately identifiable paths, being resolved from the data aspects only within an emergent web space, directory traversal attacks are prevented. Directory traversal attacks exploit a unique type of insecure direct object reference (i.e., IDOR) vulnerability common in conventional technologies and leveraged by attackers to directly access or manipulate files or folders on a web server. Malicious redirection attacks may also result, a further threat to website visitors that is eliminated by embodiments of the present invention.

Numerous exemplary advantages are achieved by embodiments of the present invention. Website pages in an emergent web space may be given any name desired, not being contingent upon registering a domain name. Names assigned to emergent website pages are related to functions of random processes and not to a global index of domain names maintained by various organizations. The inherent inaccessibility of emergent web spaces from outside of and apart from processes related to those which created them, provides an exemplary advantage to website visitors in defending against widespread and ubiquitous threats.

Figure 27A:
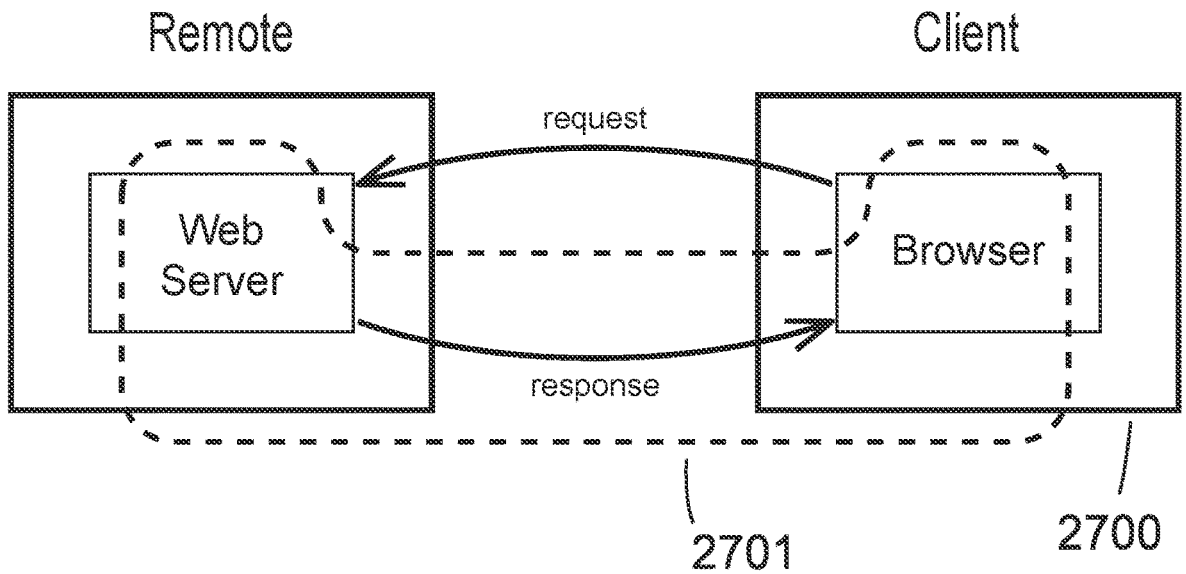
FIG. 27A is a schematic illustration of conventional request and response exchange, according to an embodiment.
Figure 27B:
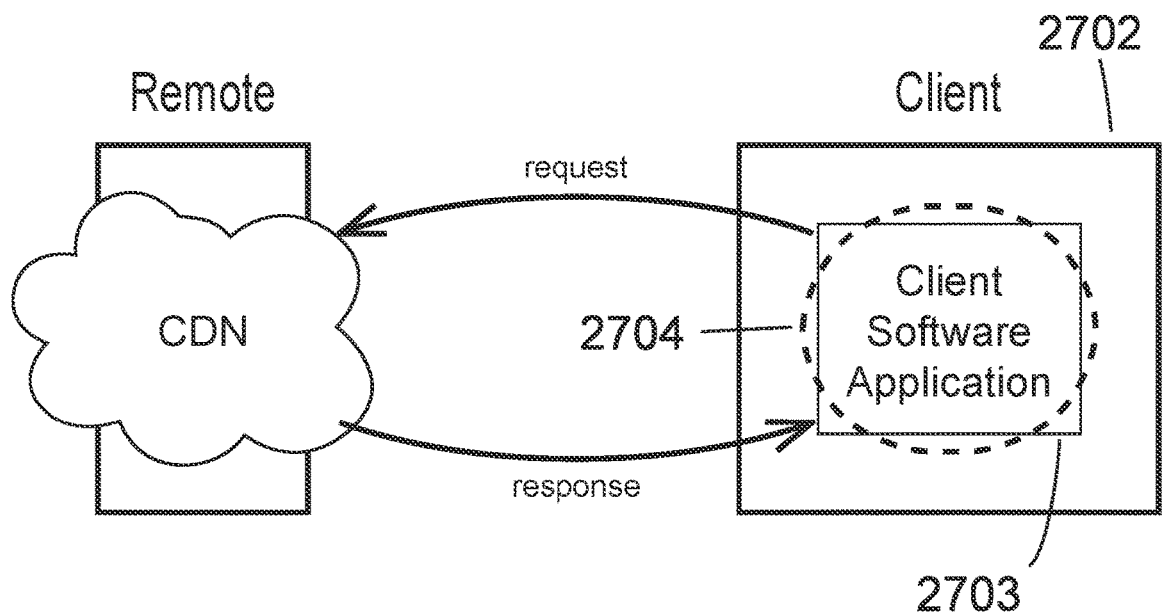
FIG. 27B is a schematic illustration of request and response exchange in accordance with the present disclosure, according to an embodiment.

FIGS. 27A and 27B illustrate exemplary advantages of the present invention by way of further comparison to conventional technologies. In a conventional scenario, client computer 2700 executes a conventional browser application making requests for web resources and in response, receives web resources from a web server, along the paths shown. Commonly, an application layer protocol (e.g., FTP, HTTP, HTTPS) is used for exchanging requests and responses. Region 2701 extends from the web server to the conventional browser application, indicating the extent to which web resources are exposed to malware, a region in which adversaries are active. By comparison, client computer 2702 executes client software application 2703 of the present invention making requests for data aspects and receiving data aspects from a remote data storage device, along the paths shown. Region 2704 is confined to the client software application 2703 executing on client computer 2702, indicating web resources are resolved only within emergent web spaces. Data aspect request and response paths shown are representative only. Alternative protocols and schemes (e.g., IPC, RPC, WebSocket and the like) may be used to request and to retrieve data aspects stored in remote data storage devices.

Conventional web browsers are widely considered the largest single attack surface in an organization. The disclosed system comprises one or more client computers executing a browser-like application to resolve and to render websites in emergent web spaces first created by a software application executing on the host computer. It is an object of the present invention to permit document titles as entered to serve as means by which a webpage in emergent web spaces may be resolved and rendered, with a similar experience as that provided by conventional technologies. In contrast to conventional technologies, embodiments of the present invention do not bind web resources to physical locations and the document title as entered is unrelated to a separately identifiable path. Moreover, because the document title is unconstrained by limitations imposed by domain names, the range of names available to identify and distinguish a webpage in emergent web spaces is far greater than permitted by conventional technologies. It is a further object of the present invention to prevent adversarial redirection, achieved by constraining the identity and resolution of webpages to emergent web spaces defined by zones.

It is a further object of the present invention to limit exposure of the browser-like software application to vulnerabilities which may exist on a client computer. Increased isolation between the software application and a client computing environment is achieved by resolving web resources only within emergent web spaces intersected by the client and a host. Ancillary resources may also be resolved from emergent web spaces, thereby alleviating a reliance on the client computing environment common to conventional browsers. For example, access controls and document editing tools may be incorporated into an emergent web space. Increased isolation is further achieved by the binding relationship in which a strong separation of control between the client and a host prevents the introduction of malware. Web resources resolved within emergent web spaces do not have separately identifiable paths. Only within emergent web spaces can even the identity of data aspects corresponding to web resources be known. Conventional browsers also suffer from increased complexity resulting from additional instructions needed to fortify the browser and protect visitors. Increased complexity is widely associated with diminished security. Embodiments of the present invention comprise a browser-like software application executing on a client computer having reduced complexity with inherently increased security.

Those skilled in the art of provisioning websites will recognize the striking contrast to conventional web technologies presented by aspects of the present invention. An emergent website may be given any name desired with no concern for domain name registration and renewal. Emergent websites intended for temporary use are easily provisioned and deprovisioned, independent of an existing domain name or website. Numerous vulnerabilities associated with domain names are eliminated, such as those exploited in subdomain takeover and DNS tunneling attacks. Also, search engine optimization (i.e., SEO) poisoning cannot be used to deceive website visitors. Because data aspects do not contain information from web resources, a host and clients are unaffected by threats associated with expired, corrupt or otherwise invalid public-key certificates. The authenticity and integrity of emergent websites is inherent in the binding relationship between host and clients, thereby preventing the introduction of malware in a man-in-the-middle (i.e., MITM) attack. Because DNS is not used for emergent web spaces, attacks which manipulate traffic (e.g., DDoS attacks) are greatly diminished. Threats associated with compromised access to resources stored in hierarchical file systems on web servers are also eliminated by embodiments of the present invention.

Embodiments of the present invention comprise a host computer having one or more processors configured to execute the method of binding a host computer to at least one client computer with emergent web spaces manifest only within the union of one or more remote data storage devices and an instance of true random data concurrently accessible to a software application executing on the at least one client computer. The method comprises invoking, by the software application executing on the host computer, an entropy device as a local source of true random data to generate a block of true random data. The method further comprises providing a copy of said block of true random data to the at least one client computer.

Embodiments of the present invention further comprise a host computer having one or more processors configured to execute the method of separating a webpage into individual web resources as data objects. The method comprises performing data compression of each data object. The method further comprises assigning unique names to each compressed data object. The method of separating a webpage into individual web resources as data objects further comprises editing a web resource to replace internal references to other resources with the unique names assigned to them as data objects. Web resources vary greatly in type and size. Although a web resource may be large, it may be highly compressible. A multi-part resource may comprise multiple references to other resources. Media files may require chunking to facilitate streaming. Therefore, comprehensive data objects are created to encapsulate information about other data objects. The method of separating a webpage into individual web resources as data objects further comprises dividing compressed data objects having a size greater than an exemplary predetermined maximum size into chunks as individual data objects and storing data objects having a size less than an exemplary predetermined minimum size in a comprehensive data object.

Embodiments of the present invention further comprise a host computer having one or more processors configured to generate, by the software application executing on the host computer, unique names for assignment to data objects. The method comprises generating an alphanumeric alias for assignment to a data object as a unique name, by iteratively selecting alphanumeric characters from a predetermined collection of alphanumeric characters in accordance with each new value output of a pseudo-random number generator. Data objects derived from web resources having a document title are assigned unique names as a function of the document title by initializing the pseudo-random number generator with a hash of the document title, first normalized. Data objects derived from web resources not having a document title may be assigned arbitrary unique names by initializing the pseudo-random number generator with any value. Generating an alphanumeric alias further comprises appending each new iteratively selected alphanumeric character to the alphanumeric alias until the predetermined length of the alphanumeric alias has been achieved.

Embodiments of the present invention further comprise a host computer having one or more processors configured to execute the method of creating a dynamic model, by the software application executing on the host computer. The dynamic model comprises a composite of random processes unique to each data object and instance of true random data. The dynamic model further comprises determining the size of a unique subset of true random data to be collected and determining the number of data elements of a first set of data into which the compressed data object is divided. The dynamic model further comprises determining a cyclic order into which the determined number of data elements of a first set of data elements are arranged, as a function of the first set of data elements and the unique subset of true random data. The dynamic model further comprises generating a second set of data elements in accordance with the arrangement of the first set of data elements and the unique subset of true random data. The dynamic model further comprises generating a data aspect by collecting data elements of the second set of data elements as a single data aspect. The dynamic model further comprises generating a unique name for assignment to the data aspect as a function of the unique alphanumeric alias assigned to the corresponding data object.

Embodiments of the present invention further comprise a host computer having one or more processors configured to generate, by the software application executing on the host computer, a unique subset of true random data in accordance with a dynamic model. The method comprises determining the length of the unique subset of true random data to be collected. If the size of a compressed data object is less than an exemplary predetermined optimal length, a single unique subset of true random data is generated having a size substantially equal to the size of the compressed data object. If the size of a compressed data object is not less than an exemplary predetermined optimal length, a unique subset of true random data is collected having a size less than the size of the compressed data object. The method further comprises initializing a pseudo-random number generator with a hash of the unique name assigned to the data object. The method further comprises iteratively stepping through a block of true random data in accordance with each new output value of the pseudo-random number generator and collecting the value at each new cumulative position in the block of true random data until the determined size of the unique subset of true random data is achieved. The method further comprises determining, by the same software application executing on the host computer, if a next new cumulative position exceeds the size of the block of true random data, determining a wrapped new position in the block of true random data.

Embodiments of the present invention further comprise a host computer having one or more processors configured to create emergent web spaces within a binding relationship, by the software application executing on the host computer. The method of creating emergent web spaces within the binding relationship comprises generating data aspects. The method further comprises transferring generated data aspects to one or more remote data storage devices. Data aspects are blocks of characteristically random data with emergent properties, generated in accordance with a dynamic model unique to each data object. Parameters of the dynamic model comprise at least the unique name and the size of a data object, and the unique subset of true random data collected in accordance with the dynamic model.

Embodiments of the present invention further comprise a host computer having one or more processors configured to execute the method of generating data aspects, by the software application executing on the host computer. The method comprises dividing the data object into at least one data element of a first set of data elements. The method further comprises generating a second set of data elements from the first set of data elements and the unique subset of true random data. If the size of a data object is less than an exemplary predetermined optimal length, the method of generating a second set of data elements comprises performing an addition modulo-2 operation between the data object as a single data element of a first set of data elements and the unique subset of true random data, thereby generating a single data element of the second set of data elements, as a data aspect. The method further comprises performing, if the size of a compressed data object is not less than an exemplary predetermined optimal length, dividing the compressed data object into a first set of more than one data element. Data elements of the first set of data elements comprising more than one data element are arranged in cyclic order. The method further comprises performing an addition modulo-2 operation between a first data element of the first set of data elements and a first portion of the unique subset of true random data, thereby generating a first data element of the second set of data elements. Successive data elements of the second set of data elements are generated by successively performing addition modulo-2 operations between successive data elements of the first set of data elements and a data element of the second set of data elements. The last data element of the second set of data elements is replaced with the results of a terminal addition modulo-2 operation between the last data element of the second set of data elements and a second portion of the unique subset of true random data. Data elements of the second set of data elements are collected as a single data aspect, by the software application executing on the host computer.

Embodiments of the present invention further comprise a client computer having one or more processors configured to identify a data aspect corresponding to an independent web resource within emergent web spaces intersected by the client computer and a host computer. A union of remote data storage devices and a block of true random data common to both the client computer and a host computer, establish a binding relationship in which emergent web spaces created by a software application executing on a host computer may be resolved by a software application executing on the client computer. The method comprises determining, by a software application executing on the client computer, the document title of an independent web resource. The document title may be selected from a menu, manually entered, communicated by other means or otherwise acquired from the binding relationship. The method further comprises determining the alphanumeric alias of the corresponding document title by initializing a pseudo-random number generator with the hash of the document title, first normalized. The method further comprises collecting alphanumeric characters as an alphanumeric alias by iteratively selecting from a predetermined list of alphanumeric characters, in accordance with each new output value of the pseudo-random number generator. The method further comprises determining the name of a data aspect by performing a hash of the alphanumeric alias.

Embodiments of the present invention further comprise a client computer having one or more processors configured to execute the method of creating a dynamic model, by the software application executing on the client computer. The dynamic model comprises a composite of random processes unique to each data aspect and instance of true random data. The dynamic model further comprises determining the size of a unique subset of true random data to be collected and determining the number of data elements of a first set of data elements into which the data aspect is divided. The dynamic model further comprises determining a cyclic order into which the determined number of elements of a first set of data elements of more than one data element are arranged, as a function of the first set of data elements and the unique subset of true random data. The dynamic model further comprises generating a second set of data elements in accordance with the arrangement of the first set of data elements and the unique subset of true random data. The dynamic model further comprises generating a compressed data object by collecting data elements of the second set of data elements as a single data object.

Embodiments of the present invention further comprise a client computer having one or more processors configured to generate, by the software application executing on the client computer, a unique subset of true random data in accordance with a dynamic model. The method comprises determining the length of the unique subset of true random data to be collected. If the size of a data aspect is less than an exemplary predetermined optimal length, a single unique subset of true random data is generated having a size substantially equal to the size of the data aspect. If the size of a data aspect is not less than an exemplary predetermined optimal length, a unique subset of true random data is collected having a size less than the size of the data aspect. The method further comprises initializing a pseudo-random number generator with the name of the data aspect. The method further comprises iteratively stepping through a block of true random data in accordance with each new output value of the pseudo-random number generator and collecting the value at each new cumulative position in the block of true random data until the determined size of the unique subset of true random data is achieved. The method further comprises determining, by the same software application executing on the client computer, if a next new cumulative position exceeds the size of the block of true random data, determining a wrapped new position in the block of true random data.

Embodiments of the present invention further comprise a client computer having one or more processors configured to resolve emergent web spaces within a binding relationship, by the software application executing on the client computer. The method of resolving emergent web spaces within the binding relationship comprises retrieving data aspects from one or more remote data storage devices, by the software application executing on the client computer. The method further comprises generating a data object in accordance with a dynamic model unique to each retrieved data aspect. Parameters of the dynamic model comprise at least the unique name and the size of a retrieved data aspect, and the unique subset of true random data collected in accordance with the dynamic model.

Embodiments of the present invention further comprise a client computer having one or more processors configured to generate a data object, by a software application executing on the client computer. The method comprises dividing a data aspect into at least one data element of a first set of data elements. The method further comprises generating a second set of data elements from the first set of data elements and the unique subset of true random data. If the size of a data aspect is less than an exemplary predetermined optimal length, the method of generating a second set of data elements comprises performing an addition modulo-2 operation between the data aspect as a single data element of a first set of data elements and the unique subset of true random data, thereby generating a single data element of the second set of data elements as a compressed data object. The method further comprises performing, if the size of a data aspect is not less than an exemplary predetermined optimal length, dividing the data aspect into a first set of more than one data element. Data elements of the first set of data elements comprising more than one data element are arranged in cyclic order. The method further comprises performing addition modulo-2 operations between the last data element of the first set of data elements and a second portion of the unique subset of true random data, thereby generating a last data element of the second set of data elements. Successive data elements of the second set of data elements are generated by performing addition modulo-2 operations in reverse cyclic order between adjacent data elements of the remaining first set of data elements. The first data element of the second set of data elements is replaced with the results of addition modulo-2 operations between the first data element of the second set of data elements and a first portion of the unique subset of true random data. Data elements of the second set of data elements are collected as a single compressed data object, by the software application executing on the host computer. Decompressed data objects are substantially identical to original web resources.

Embodiments of the present invention further comprise a client computer having one or more processors configured to execute the method of resolving a dependent web resource corresponding to an alphanumeric alias further referenced within a generated data object. The method comprises determining for each referenced alphanumeric alias, the name of a data aspect by performing a hash of the alphanumeric alias contained in the reference. The method further comprises requesting a data aspect from a remote data storage device. The method further comprises generating a data object in accordance with a dynamic model unique to a data aspect.

Embodiments of the present invention further comprise a client computer having one or more processors configured to execute the method of visually rendering a webpage resolved from emergent web spaces, by the browser-like software application executing on a client computer. The term "browser-like" refers only to a software application having the look and feel of a conventional browser in that web resources are visually rendered. Hyperlinks supporting navigation to other webpages in the emergent web space and appearing visually upon rendering, are references to alphanumeric aliases that may be resolved separately, as desired. References to dependent web resources may not appear visually upon rendering. Rendering a webpage may include separately displaying a document title, whereby the resolved webpage is visually identified.

Embodiments of the present invention further comprise a host computer having one or more processors configured to generate instances of the executable software application for deployment to at least one client computer. The method comprises embedding within the application software, information supportive of the binding relationship between a client and the host. Information supportive of the binding relationship comprises at least a copy of the block of true random data, an exemplary predetermined collection of alphanumeric characters and the exemplary predetermined values of minimum, optimal and maximum sizes. Generally, information supportive of the binding relationship as embodied on a client computer follows that embodied on the host computer of the binding relationship. For example, the exemplary predetermined collection of alphanumeric characters as embodied on a client computer is identical to that embodied on the host computer. Information supportive of the binding relationship may further incorporate algorithms implemented in the creation of dynamic models. It is within the scope of the present invention that a host computer establishes multiple binding relationships. Multiple binding relationships may embody different supportive information. For example, multiple binding relationships may embody different blocks of true random data.

Embodiments of the present invention further comprise exemplary deployment means by which instances of the executable software application are first distributed to the at least one client computer. Distribution includes, but is not limited to direct transmission from a host computer to a client computer. Exemplary deployment means also includes making instances available for download and installation on demand. For example, a host computer may deliver the executable software application to a third-party through which it is made available for download and installation in accordance with subscription channels provided by the third-party. In another embodiment, instances may be compiled and assembled in WebAssembly, a widely supported binary instruction format for a stack-based virtual machine in which an instance of the executable software application may execute in a memory-safe, sandboxed environment without requiring separate installation. Various combinations of deployment means are within the scope of the present invention. For example, components of the executable software application such as a user interface may be made available for download and installation on demand, in conjunction with other components that are compiled and assembled in WebAssembly. Those skilled in the art will be familiar with a myriad of ways in which instances of executable software applications may be deployed to one or more client computers.

An exemplary system for implementing aspects of the invention comprises an entropy device, one or more remote data storage devices and a host computing device having one or more processors configured to communicate with the entropy device, request true random data from the entropy device, store true random data in nonvolatile memory, create a dynamic model for generating a data aspect, execute hash algorithms, generate an alphanumeric alias as a unique name, generate a unique subset of a block of true random data, separate a webpage into individual web resources, replace references to other data objects with unique names, perform input and output operations consistent with reading and writing data files such as web resources, compress and decompress blocks of data, divide blocks of data into data elements, perform addition modulo-2 operations between data elements, consolidate data elements into a single coherent block of data, communicate with the one or more remote data storage devices, transfer a data aspect to the one or more remote data storage devices, retrieve or remove a data aspect from the one or more remote data storage devices, provide a block of true random data to a client computing device and provide designated unique names to a client computing device, by the software application executing on the host computer.

An exemplary system for implementing aspects of the disclosure further comprises one or more client computing devices each having one or more processors configured to communicate with one or more remote data storage devices, generate a unique name of a data aspect, retrieve data aspects from the one or more remote data storage devices, retrieve a block of true random data from nonvolatile memory, create a dynamic model for generating a data object, execute hash algorithms, generate an alphanumeric alias as a unique name, generate a unique subset of a block of true random data, divide blocks of data into data elements, perform addition modulo-2 operations between data elements, consolidate data elements into a single coherent block of data, decompress blocks of data, render website resources, derive other unique names from a data object, display a document title as the identity of a webpage and render individual data objects identified in a comprehensive data object as chunks of a media resource, by the browser-like application executing on the one or more client computing devices.

An exemplary system for implementing aspects of the disclosure further comprises one or more remote data storage devices. Embodiments within the scope of the present invention comprise remote data storage which may take the form of data lakes, cloud, multi-cloud or hybrid cloud storage. One or more content delivery networks (i.e., CDN) may be utilized as remote data storage devices. Data aspects may be stored on web servers and made available to a client application by HTTP data exchange mechanisms (e.g., REST, SOAP). Remote data storage may implement file-based network area storage (i.e., NAS) or block-based storage area networks (i.e., SAN). Remote data storage may implement sharding across one or more physical locations to increase resilience. Remote data storage may implement data storage virtualization technologies (i.e., RAID). Direct attached storage (i.e., DAS) may be implemented locally to serve as one or more remote data storage devices. DAS may be synchronized with other remote data storage (e.g., cloud) for increased redundancy, resilience and availability.

The following discussion is intended to provide a brief, general description of a suitable computing environment in which aspects of the disclosure may be implemented. Although not required, aspects of the disclosure will be described in the general context of computer-executable instructions, such as program modules being executed by computers in network environments. Generally, program modules include routines, programs, components, objects and data structures that perform particular tasks or implement particular abstract data types. Computer-executable instructions, associated data structures, and program modules represent examples of the program code and means for executing steps of the methods disclosed within the present disclosure. The particular sequence of such executable instructions or associated data structures represent examples of corresponding acts for implementing the functions described in such steps. The order of execution or performance of the operations in embodiments of the present invention illustrated and described in the present disclosure is not essential, unless otherwise specified. Operations may be performed in any order, unless otherwise specified. Embodiments may include additional or fewer operations than those disclosed within the present disclosure. It is contemplated that executing or performing a particular operation contemporaneously with (i.e., parallel), before, or after another operation is within the scope of aspects of the disclosure.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, and the like that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, and the like) and executed by one or more processors or other devices. As will be appreciated by one of skill in the art, the functionality of the program modules may be combined or distributed as desired in various embodiments. The functionality may be embodied in whole or in part in firmware or hardware equivalents such as integrated circuits, application specific integrated circuits (i.e., ASIC), field-programmable gate arrays (i.e., FPGA), and the like.

Embodiments of the present invention may be implemented with computer-executable instructions organized into one or more computer-executable components or modules. Aspects of the disclosure may be implemented with any number and organization of such components or modules and are not limited to the specific computer-executable instructions or the specific components or modules illustrated in the figures and described within the present disclosure. Other embodiments may include different computer-executable instructions or components having more or less functionality than illustrated and described within the present disclosure. Executable components or modules may comprise any combination of compiled or interpreted computer instructions, of one or more programming paradigms (e.g., object-oriented, functional, and the like), written in one or more programming languages (e.g., C, C++, Rust, C#, Java, Python, JavaScript, and the like). Components or modules may execute in a runtime environment (e.g., .NET, JVM, and the like), and on any suitable platform arrangement of hardware, operating system and virtual machine.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, smart phones, minicomputers, mainframe computers, and the like. Aspects of the disclosure may also be practiced in distributed computing environments where tasks are performed by local and remote processing devices that are linked through a communications network by hardwired links, wireless links, or by a combination of hardwired and wireless links. In a distributed computing environment, program modules may be located in both local and remote data storage devices. The computer may operate in a network environment using logical connections to one or more remote computers. The remote computers may each be another computer, laptop, tablet, smart phone, server, router, peer-to-peer or other network node, and typically include many or all of the elements described above relative to the computer. Network environments include a local area network (i.e., LAN) and a wide area network (i.e., WAN). When used in a LAN network environment, the computer is connected to the local network through a network interface or adapter. When used in a WAN networking environment, the computer may include a modem, a wireless link, or other means for establishing communications over the wide area network, such as the Internet, may be used.

An exemplary system for implementing aspects of the disclosure also includes a special purpose computing device capable of transmitting and receiving data by any of several types of transport mechanisms or information delivery media and having a processing unit, system memory and a system bus that couples various system components including the system memory to the processing unit. The system bus may be any of several types of bus structures including a memory bus or memory controller, a peripheral bus, and a local bus using any of a variety of bus architectures. The system memory includes volatile and nonvolatile memory types. A basic input/output system (i.e., BIOS) or unified extensible firmware interface (i.e., UEFI) containing the basic routines that help transfer information between elements within the computing device, such as during start-up, may be stored in read-only memory (i.e., ROM).

Embodiments within the scope of the present disclosure include implementations of computer-readable media for storing computer-executable instructions, program modules or other data, whether structured or unstructured. Computer-readable media can be any suitable media accessible to the computer, including both volatile and nonvolatile types, and may be removable or non-removable. Generally, removable types are also nonvolatile and used to carry and store application software and other data while unpowered and disconnected (e.g., optical, magnetic, solid state and the like). Volatile types generally refers to memory devices such as random access memory (i.e., RAM) used to store data during program execution while powered. When information is transferred or provided over a network or another communications connection (e.g., hardwired, wireless, or a combination of hardwired or wireless) to a computer, the computer properly views the connection as a computer-readable medium. Therefore, any such connection is properly termed computer-readable media. Combinations of the above are also included within the scope of computer-readable media. Computer-executable instructions comprise instructions and data which cause a computer having a general or special purpose to perform a certain function or group of functions.

When introducing elements of aspects of the present disclosure or the embodiments thereof, the articles "a", "an", "the" and "said" are intended to mean that there are one or more of the elements. The terms "comprises", "comprising", "including" and "having" are intended to be inclusive and mean that there may be additional elements other than the listed elements. The term "alphanumeric alias" is intended to mean a specific form of a unique name. The terms "unique name" and "alphanumeric alias" may be used interchangeably in this regard.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for binding a host computer to one or more client computers with emergent web spaces, said method involving a union of a remote data storage device and a block of true random data common to both a host and a client, and concurrently accessible to a software application executing on one or more client computers, the method comprising:

invoking, by the software application executing on a host computer, an entropy device serving as a local source of true random data, the entropy device implementing at least one of a classical random number generator and a quantum random number generator;

collecting, by the software application executing on the host computer, the true random data as a block of true random data from said entropy device;

separating, by the software application executing on the host computer, website resources into data objects, and for each data object:

designating, by the software application executing on the host computer, a unique name;

replacing, by the software application executing on the host computer, references to other web resources within the data object with designated unique names;

performing, by the software application executing on the host computer, data compression of said data object;

creating, by the software application executing on the host computer, a dynamic model for generating a data aspect by deriving a unique subset of the block of true random data in accordance with the unique name and the size of said data object;

performing, by the software application executing on the host computer, a cryptographic hash of data;

dividing said data object into a first set of at least one data element;

performing, by the software application executing on the host computer, addition modulo-2 logical operations; and generating a second set of data elements from said unique subset of true random data and the said first set of at least one data element;

transferring, by the software application executing on the host computer, said generated second set of data elements to the remote data storage device as a single data aspect;

generating, by the software application executing on the host computer, a unique name for the single data aspect;

providing a copy of said block of true random data to said software application executing on the one or more client computers; and providing said designated unique names to said application executing on the one or more client computers.

2. The method of claim 1, wherein the designated unique name assigned to the data object is derived from a document title, said deriving comprising:

normalizing the document title;

performing a hash function of the normalized document title;

initializing a pseudo-random number generator with the output of said hash function;

iteratively selecting an alphanumeric character from a predetermined collection of alphanumeric characters in accordance with each new value output of the pseudo-random number generator; and collecting said alphanumeric characters as a designated unique name by iteratively appending to the designated unique name each selected alphanumeric character.

3. The method of claim 1, wherein said generating a second set of data elements comprises:

arranging in cyclic order a first set of data elements having more than one data element;

performing addition modulo-2 logical operations between the first data element of said first set of data elements and a first portion of said unique subset of true random data, whereby a first data element of a second set of data elements is generated;

performing successive addition modulo-2 logical operations in cyclic order between each data element of the remaining said first set of data elements and a data element of said second set of data elements, whereby a next data element of the said second set of data elements is generated by said addition modulo-2 logical operations performed between said successive data elements of said first set of data elements; and replacing the last data element of said second set of data elements with the results of addition modulo-2 logical operations between said last data element of said second set of data elements and a second portion of said unique subset of true random data.

4. The method of claim 1, wherein the unique subset of true random data is derived by:

determining the size of the unique subset of true random data to be collected, in accordance with the size of a data object;

performing a hash function of the designated name of said data object;

initializing a pseudo-random number generator with the output of said hash function;

stepping iteratively through said block of true random data in accordance with each new value output of the pseudo-random generator;

collecting the value at each new cumulative position in the block of true random data until said determined size of the unique subset of true random data is achieved; and determining if a next new cumulative position exceeds the size of the block of true random data, determining a next new wrapped position.

5. The method of claim 1, wherein data objects correspond to web resources including at least one of HTML markup, executable scripts, images, video, audio, documents, style sheets and fonts.

6. The method of claim 1, wherein a comprehensive data object contains information from and about other data objects.

7. A computer-implemented method of generating a data object, said method comprising:

determining, by a software application executing on a client computer, a unique name of a data aspect from a unique name of a data object;

retrieving, by the software application executing on the client computer, said data aspect from a remote data storage device;

creating, by the software application executing on the client computer, a dynamic model for generating a data object by:

deriving a unique subset of the block of true random data in accordance with the unique name and the size of the retrieved data aspect;

dividing said data aspect into a first set of at least one data element;

generating a second set of data elements from the said first set of data elements and the said unique subset of true random data; and assembling, by the software application executing on the client computer, said generated second set of data elements as a single data object;

performing a cryptographic hash of data;

performing addition modulo-2 logical operations;

collecting data elements as a single data object;

performing data decompression of a data object;

rendering web resources as a webpage;

displaying a document title as the identity of a website.

8. The method of claim 7, wherein said performing data decompression of a data object comprises performing data decompression on said data object assembled from the said second set of data elements, whereby said data object when decompressed is substantially identical to an original web resource.

9. The method of claim 7, wherein the document title of a webpage identifies a web resource in accordance with the unique name of a corresponding data object.

10. The method of claim 7, wherein said generating a second set of data elements further comprises:

arranging in cyclic order a first set of data elements having more than one data element;

replacing the last data element of said first set of data elements with the results of addition modulo-2 logical operations between said last data element of said first set of data elements and a second portion of said unique subset of true random data;

performing successive addition modulo-2 logical operations in reverse cyclic order between two adjacent elements of said first set of data elements, whereby a next data element of said second set of data elements results from said modulo-2 logical operations performed between each said two adjacent elements, and replacing the first data element of said second set of data elements with the results of addition modulo-2 logical operations performed between said first data element of said second set of data elements and a first portion of said unique subset of true random data.

11. The method of claim 7, wherein the unique subset of true random data is derived by:

determining the size of the unique subset of true random data to be collected in accordance with the size of a data aspect;

initializing a pseudo-random number generator with the name of said data aspect;

stepping iteratively through said block of true random data in accordance with each new value output of the pseudo-random generator;

collecting the value at each new cumulative position in the block of true random data until said determined size of the unique subset of true random data is achieved; and determining if a next new cumulative position exceeds the size of the block of true random data, determining a next new wrapped position.

12. The method of claim 7, wherein a comprehensive data object represents information from and about other data objects separately resolved in parts.

13. A system for implementing an emergent web space, said system comprising:

an entropy device serving as a local source of true random data and implementing at least one of a classical random number generator and a quantum random number generator;

at least one remote data storage device;

a host computing device having one or more hardware processors configured to connect to and obtain true random data from said entropy device, store blocks of true random data in nonvolatile memory, separate a website into data objects corresponding to web resources, designate a unique name for a data object, replace references to other data objects with unique names, perform data compression of a data object, create a dynamic model for generating a data aspect, perform a cryptographic hash of data, generate a unique subset of true random data, divide a data object into data elements, perform addition modulo-2 logical operations, collect data elements as a single data aspect, generate a unique name for a data aspect, transfer generated data aspects to the at least one remote data storage device, provide a block of true random data to a client computing device and provide designated unique names to a client computing device; and a client computing device having one or more processors configured to derive a unique name of a data object from a document title, generate a unique name of a data aspect, retrieve a data aspect from the at least one remote data storage device, create a dynamic model for generating a data object, perform a cryptographic hash of data, retrieve blocks of true random data from nonvolatile memory, generate a unique subset of a block of true random data, divide a data aspect into data elements, perform addition modulo-2 logical operations, collect data elements as a single data object, perform data decompression of a data object, derive other unique names from a data object, render web resources as a webpage, render individual data objects as chunks of a media resource and display a document title as the identity of a website.

14. The system of claim 13, wherein said host computing device is additionally configured as a client computing device by executing software applications enabling said host computing device to perform roles of both host and client.

15. The system of claim 13, wherein said host computing device is further configured to generate instances of the software application for deployment to the at least one client computer and embedding within said software application at least a copy of a block of true random data.

16. The system of claim 13, wherein said host computing device generates multiple unique blocks of true random data thereby establishing multiple binding relationships with one or more client computers in the same or different zones.

17. The system of claim 13, wherein said client computing device is provided multiple blocks of true random data for binding to one or more host computers in the same or different zones.

18. The system of claim 13, wherein said entropy device further comprises at least one nonvolatile data storage component comprising data storage capacity sufficient to store one or more blocks of true random data generated by said entropy device as requested by a host computer.

* * * * *